(12) United States Patent
Kozura et al.

(10) Patent No.: US 11,785,584 B2
(45) Date of Patent: *Oct. 10, 2023

(54) DISTRIBUTED RESOURCE MODEL

(71) Applicant: Google LLC, Mountain View, CA (US)

(72) Inventors: John P. Kozura, Boulder, CO (US);
Lann Martin, Lafayette, CO (US);
Robert Collier Barnes, Erie, CO (US);
Grant Michael Erickson, Sunnyvale, CA (US); John G. Macleod, Capitola, CA (US); Jeffery T. Lee, Los Gatos, CA (US); Prashant P. Reddy, Madison, NJ (US); Gregory Rourk Nelson, Los Altos, CA (US); Jay D. Logue, San Jose, CA (US); Jerry Johns, Campbell, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/653,754

(22) Filed: Mar. 7, 2022

(65) Prior Publication Data

US 2022/0264541 A1    Aug. 18, 2022

Related U.S. Application Data

(63) Continuation of application No. 15/812,270, filed on Nov. 14, 2017, now Pat. No. 11,272,481.

(Continued)

(51) Int. Cl.
*G06F 13/10* (2006.01)
*H04W 72/04* (2023.01)

(Continued)

(52) U.S. Cl.
CPC .......... *H04W 72/04* (2013.01); *G06F 9/5011* (2013.01); *H04W 84/18* (2013.01); *Y02D 10/00* (2018.01)

(58) Field of Classification Search
CPC ..... H04W 72/04; H04W 84/18; G06F 9/5011; Y02D 10/00
See application file for complete search history.

(56) References Cited

U.S. PATENT DOCUMENTS

| 8,984,186 B2 | 3/2015 | Dureau |
| 11,272,481 B2 | 3/2022 | Kozura et al. |

(Continued)

OTHER PUBLICATIONS

"Final Office Action", U.S. Appl. No. 15/812,270, dated Sep. 19, 2019, 14 Pages.

(Continued)

*Primary Examiner* — Kevin L Young
*Assistant Examiner* — Abdou K Seye
(74) *Attorney, Agent, or Firm* — Colby Nipper PLLC

(57) ABSTRACT

A distributed resource model is described that maintains traits of resources in a distributed computing system. The traits include properties, commands, and events that, along with protocols operating in the distributed computing system, provide real-time access to the traits of resources in the distributed computing system, as well as real-time command of controls for the resources. Controllers manage and publish the traits of resources and provide various types of functionality, such as arbitration, complexity management, fan-out of capabilities, coordination, adaptation, and resource proxying.

20 Claims, 13 Drawing Sheets

Related U.S. Application Data

(60) Provisional application No. 62/421,884, filed on Nov. 14, 2016.

(51) Int. Cl.
*G06F 9/50* (2006.01)
*H04W 84/18* (2009.01)

(56) References Cited

U.S. PATENT DOCUMENTS

| | | | |
|---|---|---|---|
| 2006/0143439 A1 | 6/2006 | Arumugam et al. | |
| 2011/0063126 A1 | 3/2011 | Kennedy et al. | |
| 2012/0005376 A1* | 1/2012 | Meghdies Vardeh | G06F 9/5011 710/8 |
| 2012/0317290 A1* | 12/2012 | Taylor | G06F 9/5011 709/226 |
| 2013/0054863 A1* | 2/2013 | Imes | H04L 12/2827 709/223 |
| 2015/0109104 A1* | 4/2015 | Fadell | G08B 27/005 340/5.7 |
| 2015/0156030 A1 | 6/2015 | Fadell et al. | |
| 2015/0319411 A1 | 11/2015 | Kasmir et al. | |
| 2015/0372832 A1 | 12/2015 | Kortz et al. | |
| 2016/0132031 A1 | 5/2016 | Kozura et al. | |
| 2016/0174221 A1 | 6/2016 | Patiil et al. | |
| 2018/0139728 A1 | 5/2018 | Kozura et al. | |

OTHER PUBLICATIONS

"Final Office Action", U.S. Appl. No. 15/812,270, dated Dec. 16, 2020, 20 pages.

"First Action Interview Office Action", U.S. Appl. No. 15/812,270, dated Jun. 4, 2019, 14 pages.

"Non-Final Office Action", U.S. Appl. No. 15/812,270, dated Jun. 12, 2020, 19 Pages.

"Notice of Allowance", U.S. Appl. No. 15/812,270, dated Oct. 27, 2021, 9 pages.

"Pre-Interview Communication", U.S. Appl. No. 15/812,270, dated Apr. 12, 2019, 15 pages.

Granzer, et al., "Future Challenges for Building Automation: Wireless and Security", Automation Systems Group; Vienna University of Technology, Jul. 2010, 53 pages.

Xu, et al., "A Cloud-based monitoring framework for Smart Home", Dec. 3, 2012, 6 Pages.

\* cited by examiner

DISTRIBUTED RESOURCE MODEL

RELATED APPLICATIONS

This application is a continuation of U.S. Utility patent application Ser. No. 15/812,270, filed Nov. 14, 2017, which is now U.S. Pat. No. 11,272,481, issued Feb. 16, 2022, which in turn claims priority to U.S. Provisional Patent Application No. 62/421,884, filed Nov. 14, 2016, the disclosures of which are incorporated by reference herein in their entireties. This application is also related to U.S. Provisional Patent Application No. 62/304,013, filed Mar. 4, 2016, U.S. patent application Ser. No. 14/938,806, filed Nov. 11, 2015, which is now U.S. Pat. No. 10,601,604, issued Mar. 24, 2020, and PCT Patent Application PCT/US2015/000111, filed Nov. 12, 2015, the disclosure of which are also incorporated by reference herein in their entireties.

BACKGROUND

Distributed computing systems, including wireless mesh networks, are used to connect devices to each other, and to cloud-based services. These distributed computing systems are increasingly popular for sensing environmental conditions, controlling equipment, and securely providing information, control, and alerts to users via applications connected to the cloud-based services. A distributed computing system includes a variety of devices with varying amounts of power, computing, memory, and networking resources. Reliable, real-time reporting of events and distribution of data within the distributed computing system is required to provide consistent and timely delivery of a variety of user intents for home automation. Many devices on mesh networks are designed to operate for extended periods of time on battery-power by turning off, or sleeping, many operations such as radio and network interfaces for periods of time. However, the resources of these sleeping devices need to be available to other devices and services in the distributed computing system during these sleep periods. Resource traits may also need to be available regardless of the failure of a device or a loss of connectivity in the distributed computing system. Further, some regulatory regimes require that devices in these systems, such as a security system, be able to communicate directly with each other without communicating through cloud services and external networks.

SUMMARY

This summary is provided to introduce simplified concepts of the distributed resource model. The simplified concepts are further described below in the Detailed Description. This summary is not intended to identify essential features of the claimed subject matter, nor is it intended for use in determining the scope of the claimed subject matter.

In some aspects a distributed resource model is described, as generally related to distributing traits of resources in a distributed computing system. A controller at a host device resource subscribes to a trait of a resource. The controller receives properties of the subscribed trait from the resource. Based on receiving the properties of the subscribed trait, the controller modifies a controller trait and publishes the controller trait.

In another aspect, a distributed computing system includes a device resource and a cloud service. The cloud service instantiates a controller that hosts a trait of the device resource. The controller subscribes to the trait of the device resource. The controller receives properties of the subscribed trait from the device resource and based on the received properties of the trait, modifies a controller trait, and publishes the controller trait.

In a further aspect, a hub device in a distributed computing system advertises that the hub device is capable of hosting a controller for a trait of a resource. The hub device instantiates the controller for the trait of the resource, subscribes to the trait of the resource, and receives, from the resource, the properties of the subscribed trait. Based on the received properties of the trait, the hub device modifies the controller trait and publishes the controller trait.

BRIEF DESCRIPTION OF THE DRAWINGS

Aspects of the distributed resource model are described with reference to the following drawings. The same numbers are used throughout the drawings to reference like features and components.

DETAILED DESCRIPTION

Figure 1:
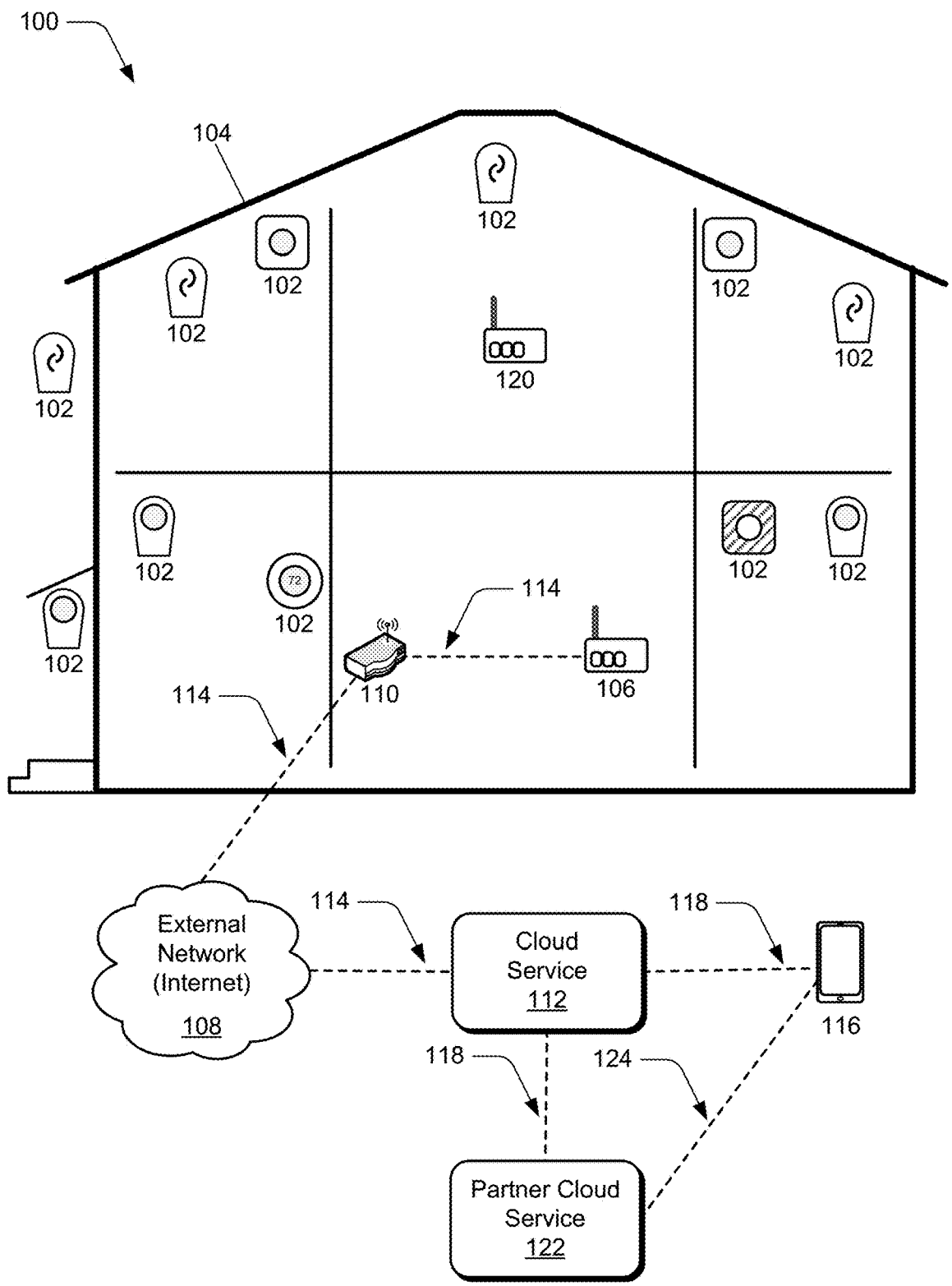
FIG. 1 illustrates an example distributed computing system in which various aspects of the distributed resource model can be implemented.

Distributed computing systems can provide home automation with low-power devices and wireless networks connected to cloud-based services and web-connected user applications. Devices in the distributed computing system are heterogeneous and built with varying capabilities. The hosts or devices that comprise the distributed computing system range from battery-powered, microcontroller-based devices, which sleep periodically to conserve battery power, to line-powered devices with always-on connectivity in the home, to server farms hosting cloud-based services.

Users of home automation systems expect responsive and reliable experiences when interacting with the system. A heterogeneous, distributed computing system needs to provide real-time, distributed data management and subscriptions, low-latency command-and-response control of devices, and real-time event notification between devices and to user applications, regardless of the manufacturer, location, and types of devices in the system.

A battery-powered device that sleeps for extended periods of time is not available to provide real-time, low-latency access to attributes stored in the device or responses to a command from a user application. A distributed resource model with options for hosting the attributes and controls for sleeping devices in controllers, which can be distributed to other hosts in the distributed computing system, provides real-time, low-latency responsiveness for access to attributes and controls of the sleepy devices.

Microcontroller-based devices with limited resources may only be able to provide very simple functionality that does not include a range of features that a user expects or that is provided by a more full-featured device with greater resources. Controllers in the distributed resource model can represent these simple devices to actors in the distributed computing system. The controllers can provide the additional features that the simple device lacks. These controllers can also provide a similar set of features to all devices of a particular device class by either adding missing features, or providing a consistent set of features for all devices regardless of the capabilities or manufacturer of each device.

Hosting controllers for resources in varying locations in the distributed computing system may be required by regulatory requirements, such as security systems where all devices in a structure are required to communicate without using cloud-based services. Locating the controllers at the cloud-based service provides faster responsiveness to applications running on internet clients. Controllers in the distributed resource model can be migrated between various hosts to provide regulatory compliance for applications or responsiveness for user interactions. The ability to migrate controllers also provides fallbacks to improve system reliability by falling back to a cloud-based controller if a wide-area network link to a home area network becomes impaired.

Rule-based and/or schedule-based automation controllers offer limited capabilities and flexibility for a home automation system. Achieving multiple automation objectives may cause conflicts or contention for common resources. Controllers can apply domain logic using traits available in the distributed resource model to orchestrate the intent of a user and arbitrate resource conflicts and interdependencies to solve automation problems that fixed rules fail to address, while reducing programming effort for the user of the home automation system.

While features and concepts of the described systems and methods for the distributed resource model can be implemented in any number of different environments, systems, devices, and/or various configurations, aspects of the distributed resource model are described in the context of the following example devices, systems, and configurations.

FIG. 1 illustrates an example distributed computing environment 100 in which aspects of the distributed resource model can be implemented. The distributed computing environment 100 includes a home area network (HAN) such as a mesh network 200, described below with respect to FIGS. 2 and 3. The HAN includes mesh network devices 102 that are disposed about a structure 104, such as a house, and are connected by one or more wireless and/or wired network technologies, as described below. The HAN includes a border router 106 that connects the HAN to an external network 108, such as the Internet, through a home router or access point 110.

To provide user access to functions implemented using the mesh network devices 102 in the HAN, a cloud service 112 connects to the HAN via border router 106, via a secure tunnel 114 through the external network 108 and the access point 110. The cloud service 112 facilitates communication between the between the HAN and internet clients 116, such as apps on mobile devices, using a web-based application programming interface (API) 118. The cloud service 112 also manages a home graph that describes connections and relationships between the mesh network devices 102, elements of the structure 104, and users. The cloud service 112 hosts controllers which orchestrate and arbitrate home automation experiences, as described in greater detail below.

The HAN may include one or more mesh network devices 102 that function as a hub 120. The hub 120 may be a general-purpose home automation hub, or an application-specific hub, such as a security hub, an energy management hub, an HVAC hub, and so forth. The functionality of a hub 120 may also be integrated into any mesh network device 102, such as a smart thermostat device or the border router 106. In addition to hosting controllers on the cloud service 112, controllers can be hosted on any hub 120 in the structure 104, such as the border router 106. A controller hosted on the cloud service 112 can be moved dynamically to the hub 120 in the structure 104, such as moving an HVAC zone controller to a newly installed smart thermostat.

Hosting functionality on the hub 120 in the structure 104 can improve reliability when the user's internet connection is unreliable, can reduce latency of operations that would normally have to connect to the cloud service 112, and can satisfy system and regulatory constraints around local access between mesh network devices 102.

The mesh network devices 102 in the HAN may be from a single manufacturer that provides the cloud service 112 as well, or the HAN may include mesh network devices 102 from partners. These partners may also provide partner cloud services 122 that provide services related to their mesh network devices 102 through a partner Web API 124. The partner cloud service 122 may optionally or additionally provide services to internet clients 116 via the web-based API 118, the cloud service 112, and the secure tunnel 114.

The distributed computing environment 100 can be implemented on a variety of hosts, such as battery-powered microcontroller-based devices, line-powered devices, and servers that host cloud services. Protocols operating in the mesh network devices 102 and the cloud service 112 provide a number of services that support operations of home automation experiences in the distributed computing environment 100. These services include, but are not limited to, real-time distributed data management and subscriptions, command-and-response control, real-time event notification, historical data logging and preservation, cryptographically controlled security groups, time synchronization, network and service pairing, and software updates.

Figure 2:
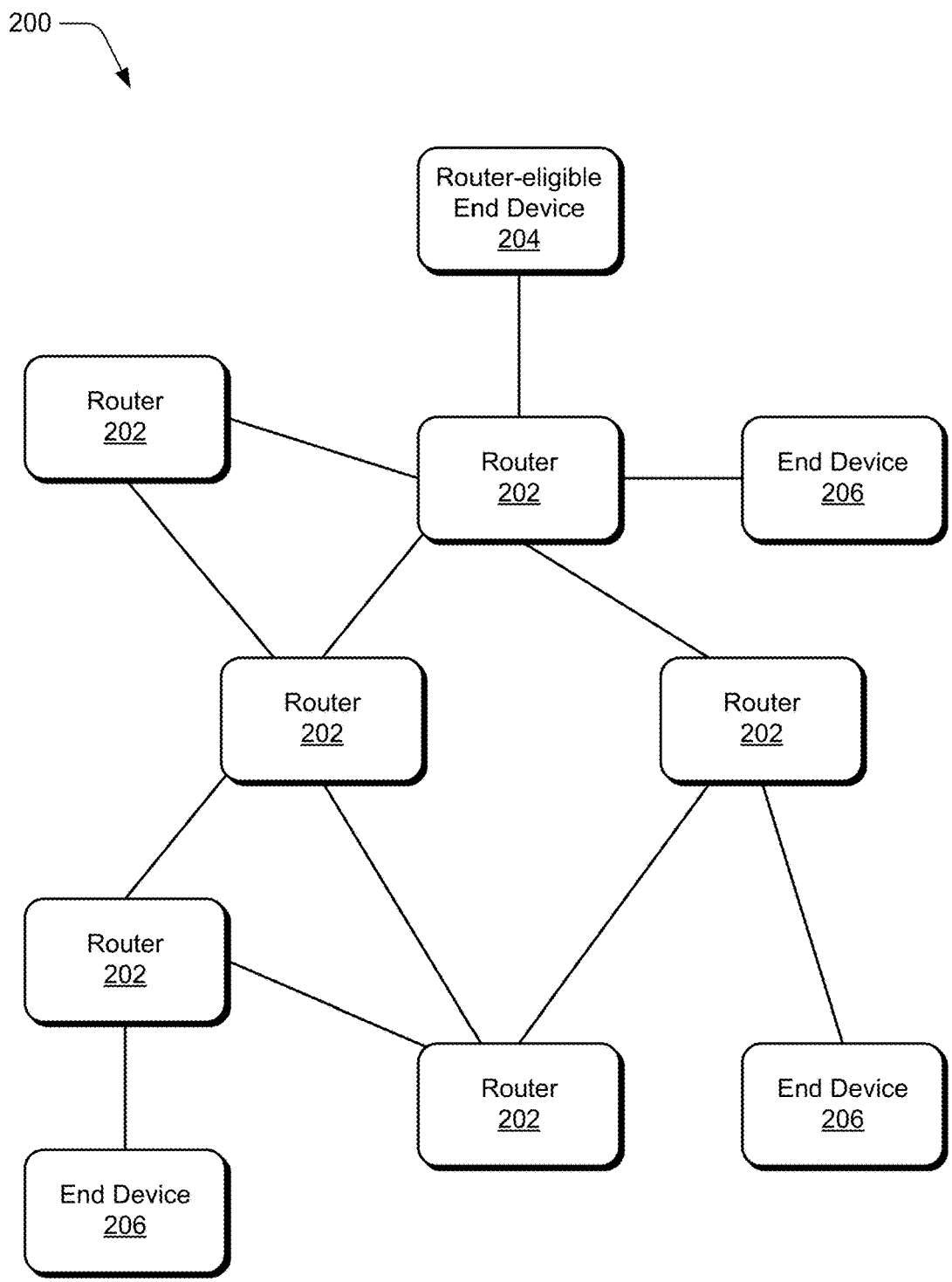
FIG. 2 illustrates an example mesh network system in which various aspects of the distributed resource model can be implemented.

FIG. 2 illustrates an example mesh network system 200 that implements the HAN in the distributed computing environment 100. The mesh network 200 is a wireless mesh network that includes routers 202, a router-eligible end device 204, and end devices 206. The routers 202, the router-eligible end device 204, and the end devices 206, each include a mesh network interface for communication over the mesh network. The routers 202 receive and transmit packet data over the mesh network interface. The routers 202 also route traffic across the mesh network 200. The routers 202 and the router-eligible end devices 204 can assume various roles, and combinations of roles, within the mesh network 200, as discussed below.

The router-eligible end devices 204 are located at leaf nodes of the mesh network topology and are not actively routing traffic to other nodes in the mesh network 200. The router-eligible device 204 is capable of becoming a router 202 when the router-eligible device 204 is connected to additional devices. The end devices 206 are devices that can communicate using the mesh network 200, but lack the capability, beyond simply forwarding to its parent router 202, to route traffic in the mesh network 200. For example, a battery-powered sensor is one type of end device 206.

The routers 202, the router-eligible end device 204, and the end devices 206 include network credentials that are used to authenticate the identity of these devices as being a member of the mesh network 200. The routers 202, the router-eligible end device 204, and the end devices 206 also use the network credentials to encrypt communications in the mesh network.

During sleep periods, a child end device 206 that sleeps is not available on the mesh network 200 to receive data packets addressed to the child end device 206. The child end device 206 attaches to a parent router 202, which responds, on behalf of the child end device 206, to mesh network traffic addressed to that child end device 206.

The child end device 206 also depends on the parent router 202 to receive and store all data packets addressed to the child device 206, including commissioning datasets, which may be received while the child end device 206 is sleeping. When the child end device 206 awakes, the stored data packets are forwarded to the child end device 206. The parent router 202 responding on behalf of the sleeping child end 206 device ensures that traffic for the child end device 206 is handled efficiently and reliably on the mesh network 200, as the parent router 202 responds to messages sent to the child end device 206, which enables the child end device to operate in a low-power mode for extended periods of time to conserve power.

Figure 3:
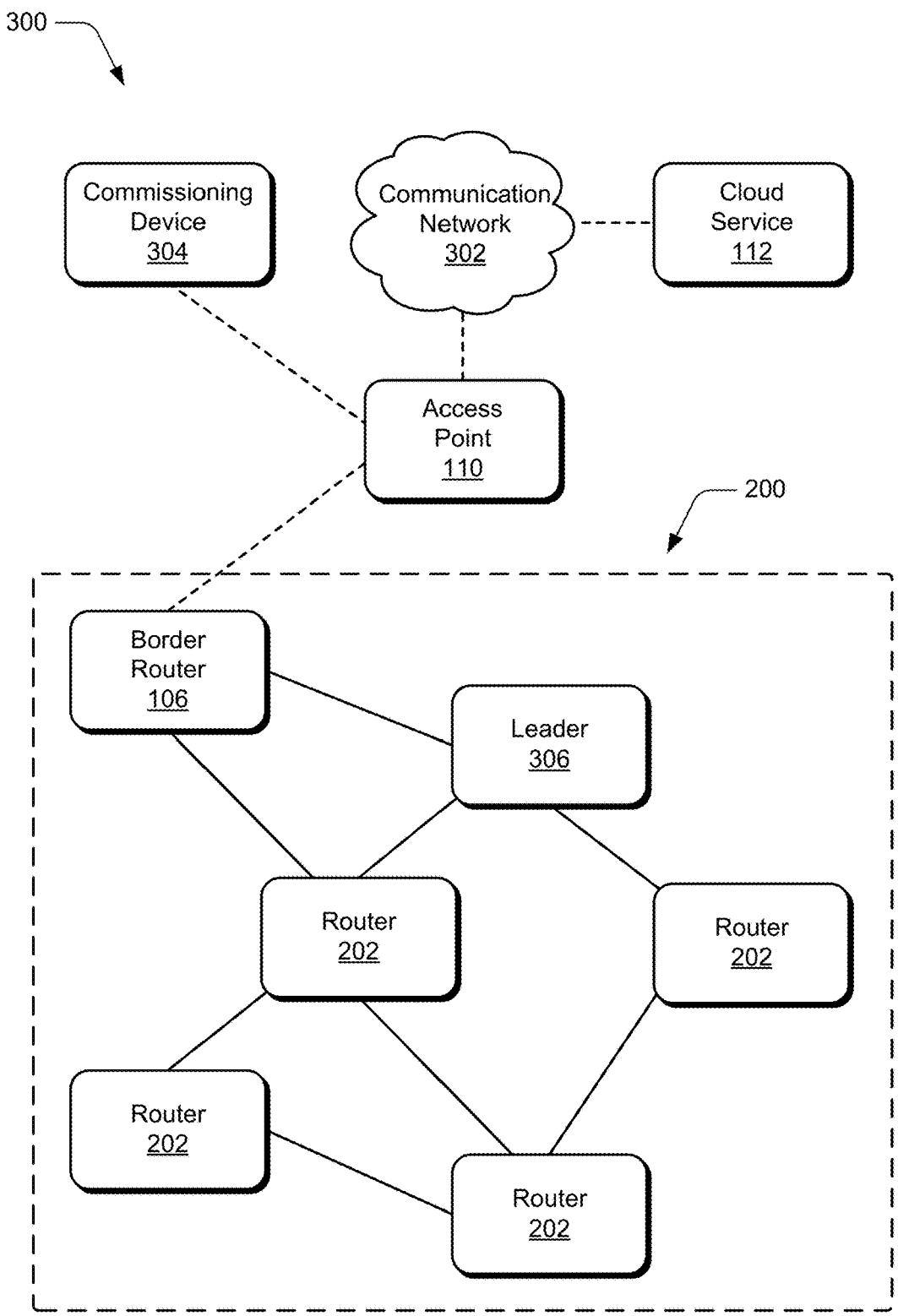
FIG. 3 illustrates an example environment in which various aspects of the distributed resource model can be implemented.

FIG. 3 illustrates an example environment 300 in which various aspects of the distributed resource model can be implemented. The environment 300 includes the mesh network 200, in which some routers 202 are performing specific roles in the mesh network 200. The devices within the mesh network 200, as illustrated by the dashed line, are communicating securely over the mesh network 200, using the network credentials.

The border router 106 (also known as a gateway and/or an edge router) is one of the routers 202. The border router 106 includes a second interface for communication with an external network, outside the mesh network 200. The border router 106 connects to an access point 110 over the external network. For example, the access point 110 may be an Ethernet router, a Wi-Fi access point, or any other suitable device for bridging different types of networks. The access point 110 connects to a communication network 302, such as the Internet. The cloud service 112, which is connected via the communication network 302, provides services related to and/or using the devices within the mesh network 200. By way of example, and not limitation, the cloud service 112 provides applications that include connecting end user devices (internet clients), such as smart phones, tablets, and the like, to devices in the mesh network 200, processing and presenting data acquired in the mesh network 200 to end users, linking devices in one or more mesh networks 200 to user accounts of the cloud service 112, provisioning and updating devices in the mesh network 200, and so forth.

A user choosing to commission and/or configure devices in the mesh network 200 uses a commissioning device 304, which connects to the border router 106 via the external network technology of the access point 110, to commission and/or configure the devices. The commissioning device 304 may be any computing device, such as a smart phone, tablet, notebook computer, and so forth, with a suitable user interface and communication capabilities to execute applications that control devices to the mesh network 200. Only a single commissioning device 304 may be active (i.e., an active commissioner) on the mesh network 200 at time.

One of the routers 202 performs the role of a leader 306 for the mesh network 200. The leader 306 manages router identifier assignment and the leader 306 is the central arbiter of network configuration information for the mesh network 200. The leader 306 propagates the network configuration information to the other devices in the mesh network 200. The leader 306 also controls which commissioning device is accepted as a sole, active commissioner for the mesh network 200, at any given time.

Figure 4:
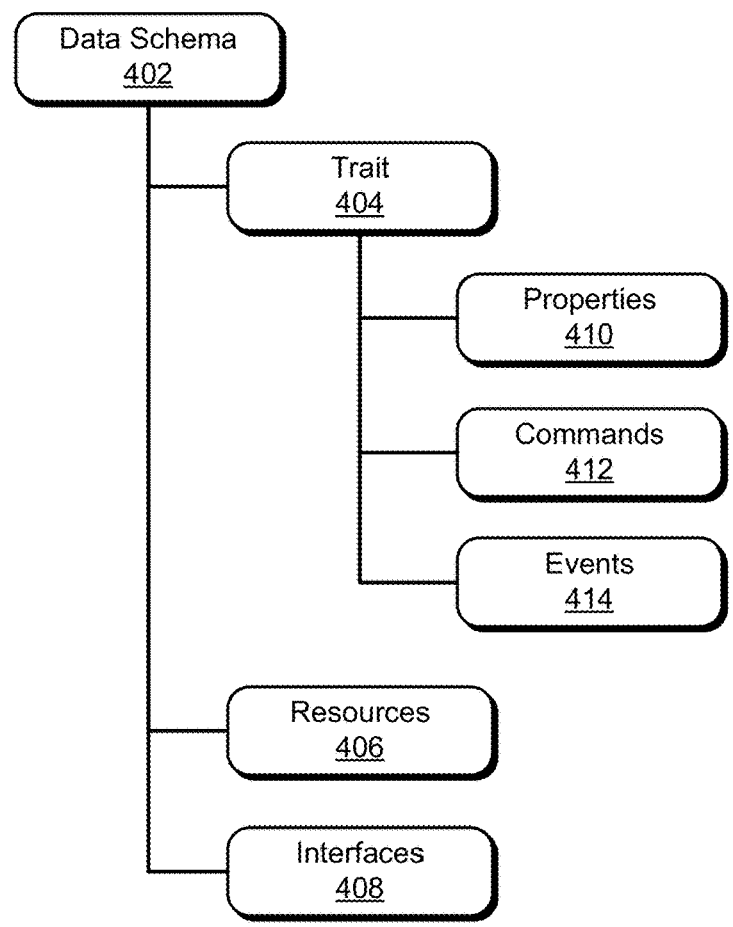
FIG. 4 illustrates an example of a data schema in a distributed computing system in accordance with aspects of the distributed resource model.

FIG. 4 illustrates an example resource model 400 for the distributed resource model. The resource model 400 illustrates a data schema 402 that supports the protocols and operations of the mesh network devices 102 and the cloud service 112. The data schema 402 describes functionality of devices, and the services and clients that interact with the devices. The data schema 402 includes traits 404, resources 406, and interfaces 408. The traits 404 describe small, composable units of functionality, which include properties 410, commands 412, and events 414, along with a semantic understanding of how the traits 404 operate to implement the functionality.

The properties 410 are characteristics of the trait 404 that represent the state of a resource, for example, the brightness of a light or whether someone is home. The properties 410 are typed, and a label and numeric tag are used to communicate each property 410. For example, the types of the properties 410 include Boolean, integer, unsigned integer, enumerated, number, string, string reference, bytes, structures, lists, maps, and so forth. The properties 410 may also have metadata indicating constraints, readability, and/or serialization specifics. The properties 410 are operated on using three state management operations or protocols: observe, update, and notify. State management is the primary means of command and control for the mesh network devices 102.

The commands 412 are requests for action sent to the trait 404 with an expected response. While most operations are managed using the properties 410 with the standard state commands of observe and update, a subset of operations are not amenable to property management. For example, a NextTrack( ) command on a media player trait requests changes to the properties 410 that the client could not compute, and a ScanNetwork( ) command on a Wi-Fi trait is requesting results with no property effects. The command 412 has request parameters and expected response parameters.

The event 414 is a unidirectional assertion of truth about a trait 404 at a specific time. This mechanism is used to asynchronously communicate occurrences on the trait 404 to other actors in the distributed computing system 100. Most events 414 are related to property changes and communicated with a standard notify event. Other events 414 can communicate arbitrary, non-property-based occurrences, such as the ringing of a doorbell. Multiple events 414 may be correlated to enable composition across the traits 404, for example, a pincode entry event could be correlated with an unlock event indicating that the entry of a pincode caused a door to unlock. The events 414 consist of parameters and a timestamp.

The properties 410, commands 412, and events 414 work together to define a comprehensive mechanism for interacting with the traits 404. Settings and actions are primarily handled through property management, with the commands 412 for handling requests that are not amenable to the properties 410. For example, a brightness property on a lighting trait would be updated by a client to change the brightness on a physical device. An operation such as scanning Wi-Fi networks or skipping a track on a music player would use the command 412. A notification of changes on a specific entity is conveyed through property notifications and general purpose events 414, which clients may subscribe to and monitor.

The resource 406 is a group of the traits 404 and interfaces 408 that represent a logical or physical entity, such as a mesh network device 102, a structure 104, a user, or an external source of information, such as weather data. Each interface 408 is a combination of traits that operate together to provide a specific function. The traits 404 can be composed into the interfaces 408, which indicate how basic units of functionality work together to form a higher level of functionality. For example, a number of burners, controls, and on/off indicators may be composed to provide an interface for a stove. The traits 404 and instances of the interfaces 408 are collected into the resources 406, which describe all the functionality for an actor in the distributed computing environment 100, such as a device or room in the structure 104.

Figure 5:
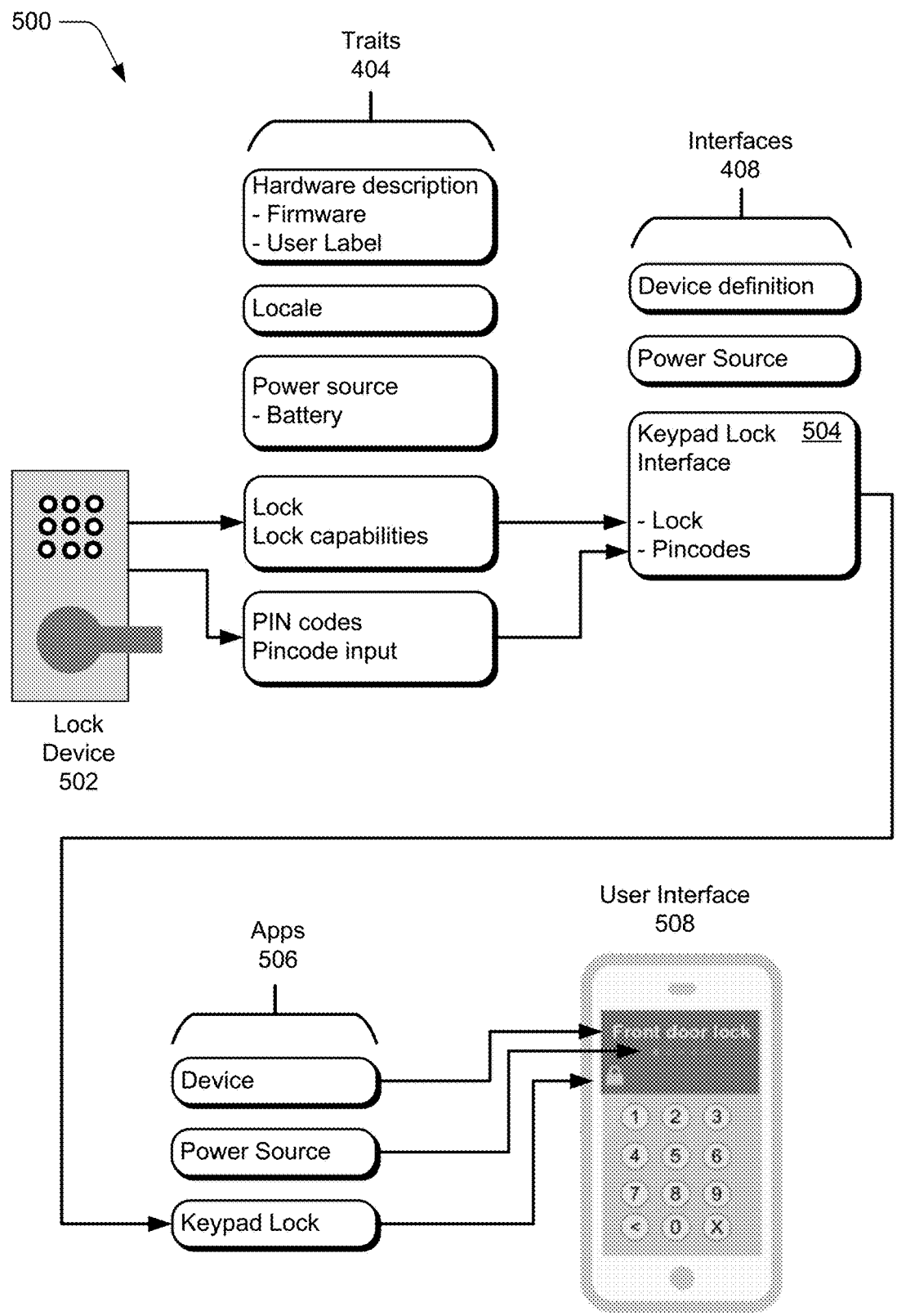
FIG. 5 illustrates an example of relationships between devices, traits, interfaces, and apps in a distributed computing system in accordance with aspects of the distributed resource model.

The schema below describes an example of the relationship between the traits 404, the resources 406, and the interfaces 408. Two interfaces 408 are described for the functionality of a security camera and an intercom. The security camera interface is composed of the traits of a video camera and a microphone. The intercom interface is composed of traits of a microphone and a speaker. A NestCam resource 406 for a network-connected security camera, such as the Nest® Cam™, includes four traits 404 (Microphone 1, Microphone 2, Speaker, and VideoCamera) that can be composed into instances of the security camera and intercom interfaces. The interface instance Intercom 1 includes the traits Microphone 1 and Speaker from the NestCam resource. The interface instance Intercom 2 includes the traits Microphone 2 and Speaker from the NestCam resource. The SecurityCamera interface instance includes the traits Microphone 1 and VideoCamera from the Nest-Cam resource:

Interface: SecurityCamera
Trait: VideoCamera
Trait: Microphone
Interface: Intercom
Trait: Microphone
Trait: Speaker
Resource: NestCam
Traits
   Microphone 1
   Microphone 2
   Speaker
   VideoCamera
Interface Instances:
Intercom 1
   Microphone 1
   Speaker
Intercom 2
   Microphone 2
   Speaker
SecurityCamera
   Microphone 1
   VideoCamera FIG. 5 illustrates another example of the relationship between the traits 404, and the interfaces 408. A lock device 502 is a resource 406 that includes a number of traits 404 that define characteristics of the lock device 502. For example, the "Lock" and "Lock capabilities" traits can be combined to form a Lock interface. The traits 404 can be mixed together, so the Lock traits and the Pincodes traits can be combined to form the integrated functionality of a Keypad Lock Interface 504. Higher, application-level functions, such as apps 506, are developed against the interfaces 408. For example, the functions of the lock device 502 are presented to a user in the user interface 508, where the "Device" app 506 presents a label indicating which device, the "Front door lock," is presented, along with an indication of the status of the "Power Source," and the status and controls for the "Keypad Lock," which show an icon indicating the status of the lock as being locked and provide a keypad for a pincode entry to control the function of the lock device 502.

Figure 6A:
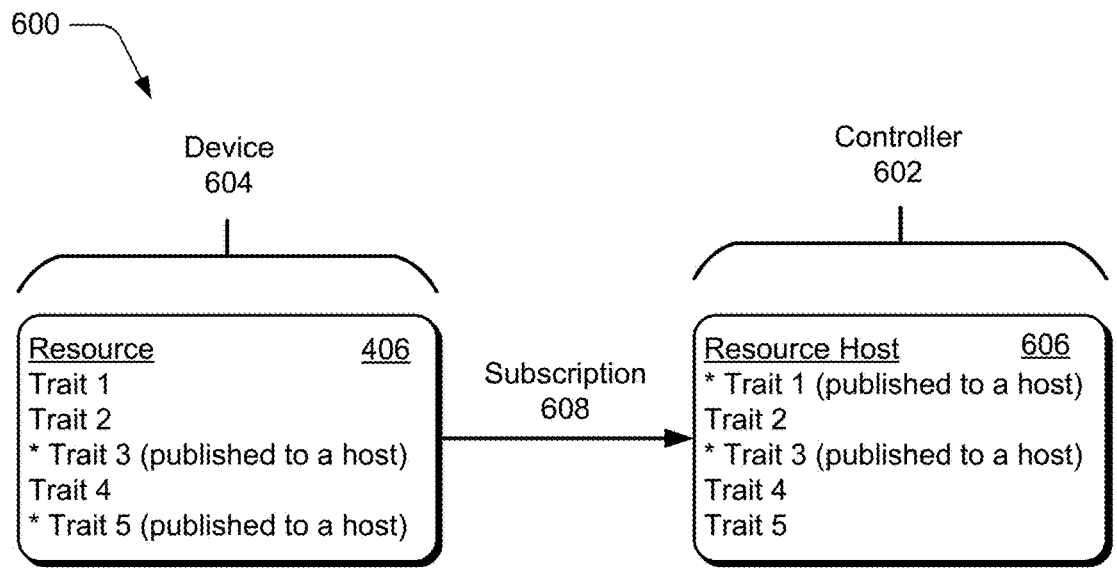
FIGS. 6a and 6b illustrate examples of controllers in a distributed computing system in accordance with aspects of the distributed resource model.
Figure 6B:
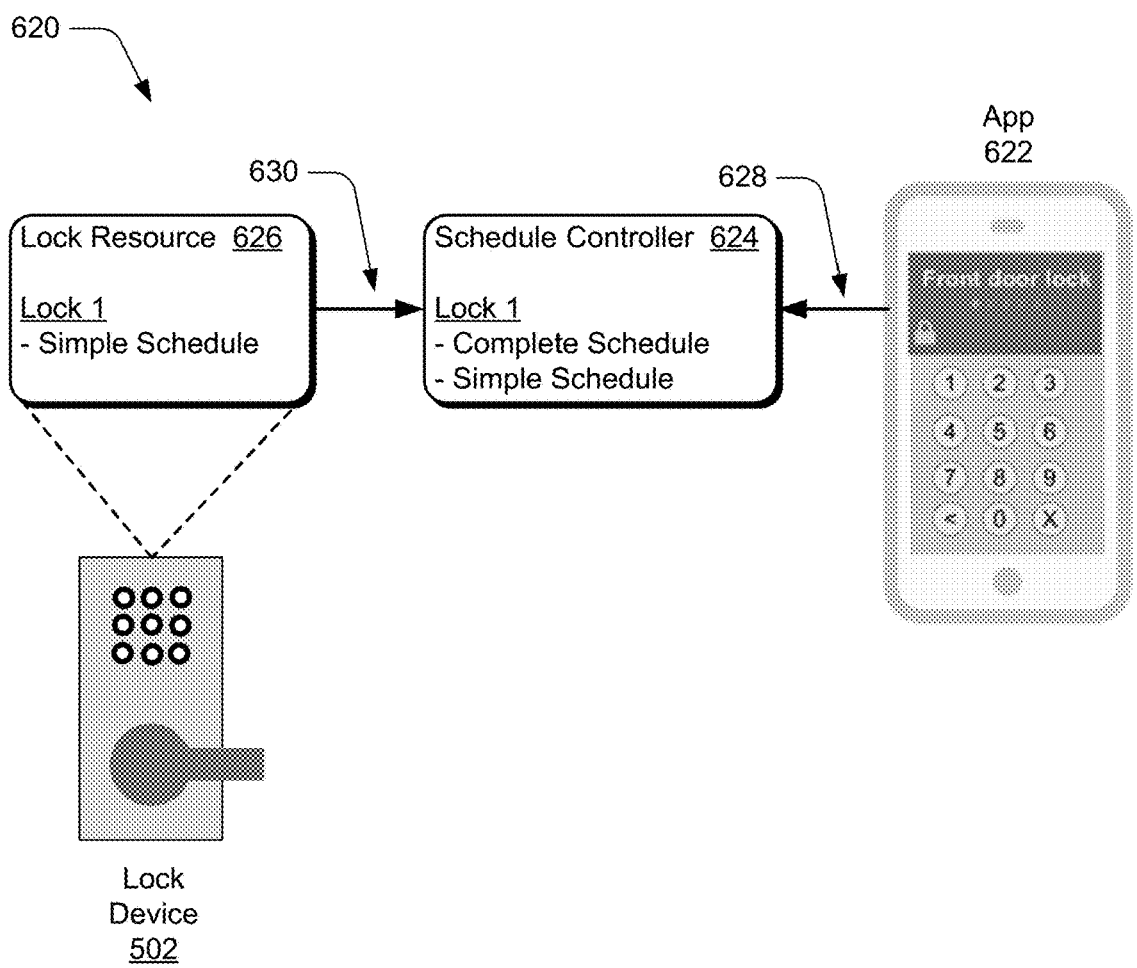

FIGS. 6a and 6b illustrate examples of the distribution of the traits 404 of the distributed resource model across the distributed computing environment 100. The implementation of the resources 406 is often distributed across the distributed computing environment 100 at the trait level. This is accomplished through a distributable unit of functionality called a controller 602 that exposes and consumes various resource traits 404 to perform the function of the controller 602. The controller 602 exposes its functionality through the traits 404 on the resources 406, either hosting a trait 404 for a particular resource 406 or operating on and/or subscribing to a trait 404 that is hosted elsewhere.

For example, in FIG. 6a, a device 604 is represented as a resource 406 that includes a number of traits (e.g. Trait 1 through Trait 5) and the controller 602 is illustrated as a resource host 606 corresponding to the device 604. The controller 602 can subscribe, shown as subscription 608, to traits in the device 604 so that the controller 602 is informed of changes in the properties 410 of the subscribed trait 404 or receives the events 414 from the subscribed trait 404. Likewise the controller 602 can publish its traits 404 to interested entities, such as the devices 604, services in the cloud service 112, or an application on an internet client 116.

FIG. 6b illustrates the example of the controllers 602 in the context of the lock device 502. The lock device 502 may be a lock implemented on a basic microcontroller with limited resources that can only implement a simple scheduling trait for access times, while a more comprehensive schedule trait is desired for a lock app 622. A controller 602 is defined and implemented to translate between the simple schedule for consumption by the lock device 502 and the comprehensive schedule for the app 622. When the lock device 502 is brought online, the cloud service 112 invokes a schedule controller 624, which then provides the higher-level "Complete Schedule" trait 404 that the lock resource 626 and the lock device 502 lack.

The user of the app 622 has access to the functionality of the complete schedule provided by the schedule controller 624. The app 622 can subscribe to any of the traits 404 published by the schedule controller 624 via subscription 628. The schedule controller 624 translates the more full-featured traits of the Complete Schedule into traits of the Simple Schedule. The lock resource 626 subscribes to traits 404 published by the schedule controller 624, via the subscription 630, to receive changes to the Simple Schedule trait of the schedule controller 624. The lock resource 626 updates its simple schedule trait 404 to provide the lock device 502 with an updated access schedule.

Figure 7:
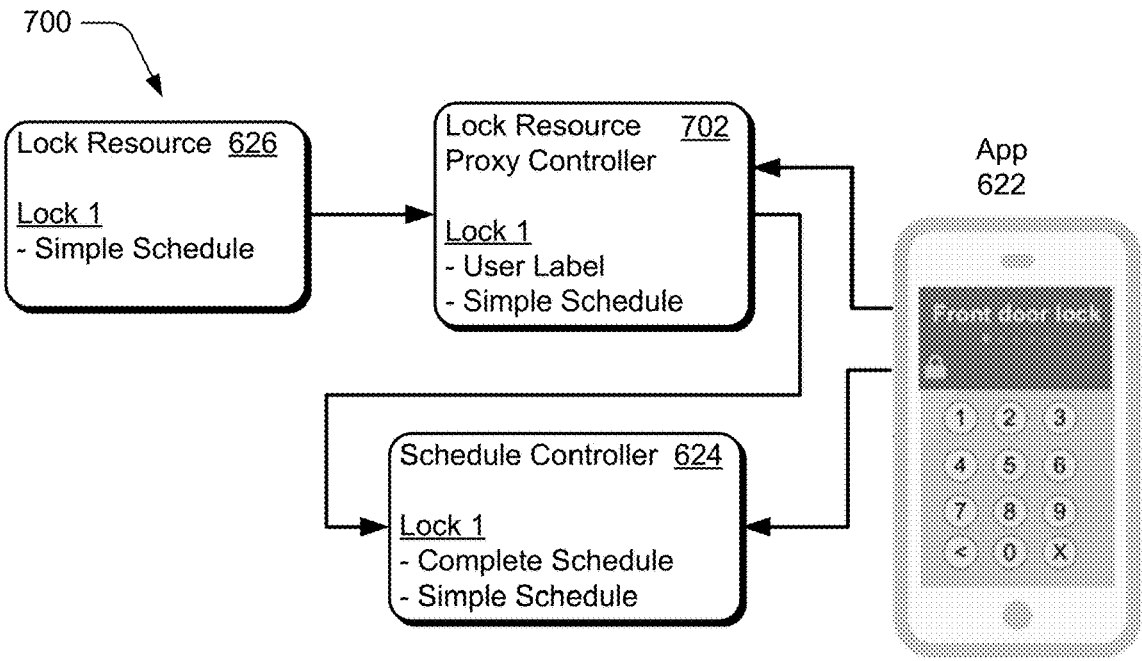
FIG. 7 illustrates an example of a proxy controller in a distributed computing system in accordance with aspects of the distributed resource model.

FIG. 7 illustrates a further example of the distribution of the traits 404 of the distributed resource model across the distributed computing environment 100. For the sake of clarity in FIG. 7, identifiers of subscriptions are omitted from the figure. Each arrow represents a subscription, the head of the arrow pointing to the publisher in each publish-subscribe relationship. As discussed above, some mesh network devices 102 are the child end devices 206 that sleep for periods of time and are not always available on the mesh network 200 to receive data packets that communicate the traits 404 to the child end device 206. One type of controller 602 is a resource proxy that is important for both sleepy, low-capability devices and remote control of HAN devices. The resource proxy controller proxies the traits 404 of a mesh network device 102 providing reliable access to the data of the mesh network device 102, which may otherwise be inaccessible because the device is sleeping, is located on an unreliable network connection, or is not capable of servicing requests for its data.

The cloud service 112 can create a resource proxy for any or all mesh network devices 102 in the HAN, which enables the cloud service 112 to manage many properties and command queues of the mesh network device 102, regardless of the connectivity of the mesh network device 102. The use of the resource proxy controller for the mesh network device 102 provides a single point of connection for the cloud service 112, without the cloud service 112 having to understand the topology of additional controllers 602 in the distributed computing system 100. The resource proxy controller can also publish the traits 404 that the mesh network device 102 may not care to manage, such as the user's label for the mesh network device 102.

Turning back to the example of the lock device in FIG. 7, a resource proxy controller 702 for the lock resource 626 provides the resource proxy for the traits 404 of the lock resource 626. The lock resource 626 subscribes to a lock resource proxy controller 702 to receive changes to the Simple Schedule trait instead of subscribing to the schedule controller 624, as previously illustrated in FIG. 6b.

The schedule controller 624 translates changes made to the Complete Schedule trait into changes to the Simple Schedule trait as before, but the lock resource proxy controller 702 subscribes to Simple Schedule trait of the schedule controller 624 on behalf of the lock resource 626. The lock resource proxy controller 702 also manages and publishes the User Label trait on behalf of the Lock Resource 626, which frees the lock resource 626 and the lock device 502 from consuming resources to store and publish the User Label. The app 622 subscribes to the User Label trait of the lock resource proxy controller to obtain the User Label information displayed by the app 622.

Figure 8:
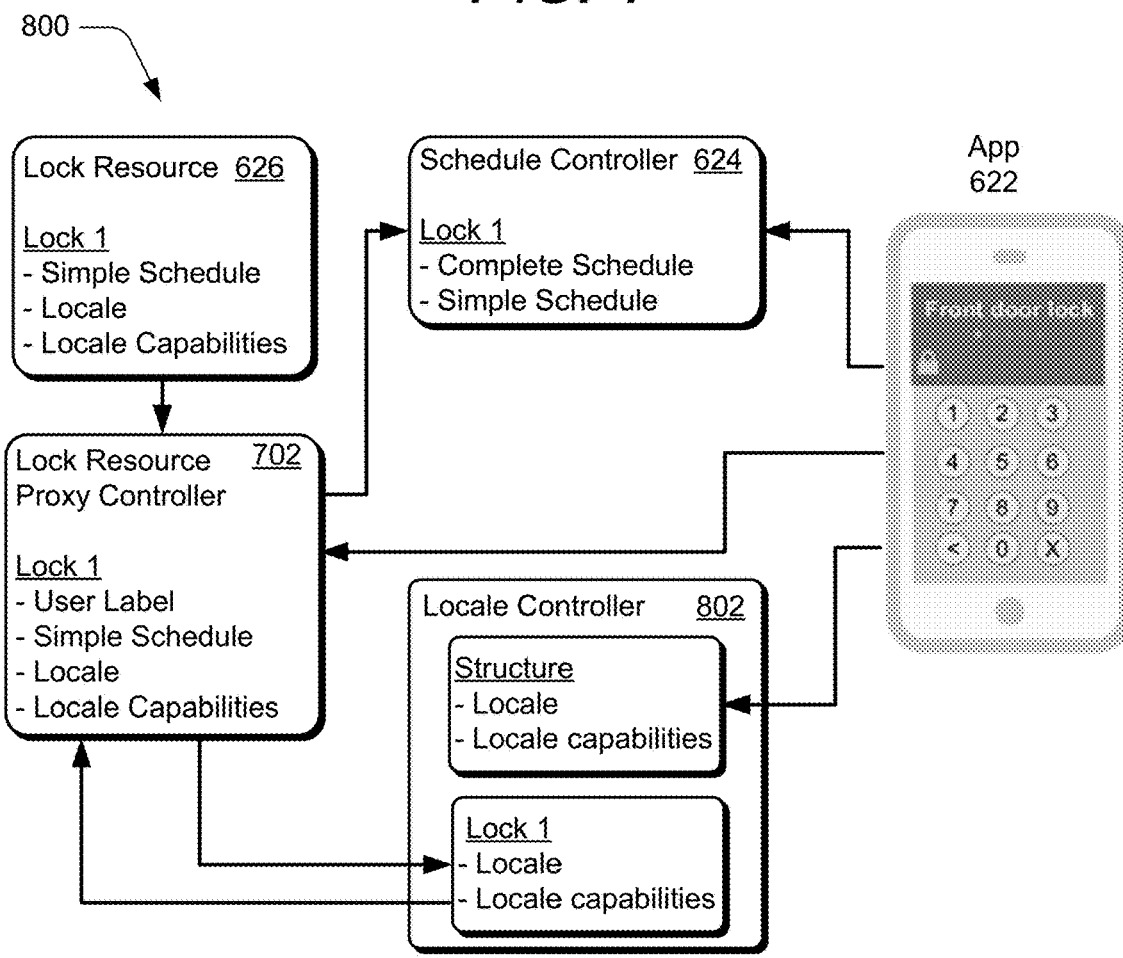
FIG. 8 illustrates an example of a locale controller in a distributed computing system in accordance with aspects of the distributed resource model.

FIG. 8 illustrates a further example of the distribution of the traits 404 of the distributed resource model across the distributed computing environment 100. For the sake of clarity in FIG. 8, identifiers of subscriptions are omitted from the figure. Each arrow represents a subscription, the head of the arrow pointing to the publisher in each publish-subscribe relationship. Another use of the controller 602 is to manage and publish traits used by a number of mesh network devices 102, resources 406, and/or other controllers 602. For example, a locale or language trait is used to determine which language to use to display information in a user interface. Normally a user would manage this on each device, but a fan-out controller can be created to manage the locale for different areas within the same structure 104 or across the entire structure 104. The fan-out controller provides a locale trait for the structure resource and a locale trait for each resource device that is part of the HAN in the structure 104. The resource handler for the device points to the controller 602 for the locale trait. Without any change to the device, its locale is now managed at the structure level.

In returning to our lock example as illustrated in FIG. 8, a locale controller 802 is added to the other controllers 602 from the previous example of FIG. 7. The locale controller 802 provides a structure trait for the structure 104, such as a locale that indicates that English is the appropriate language to use in user interface displays and prompts. Each resource 406 and controller 602 can publish its local capabilities trait and subscribe to the locale trait for the structure 104. The structure 104 may also be subdivided to provide locale traits 404 for different portions of the structure 104, such as to provide a user interface in French in a guest room where a relative from France is staying during a visit.

The structure 104 is described by a home graph that is a relationship graph between the components of the structure 104 and the resources 406. For example, a lock resource is associated with a door and the door is associated with a room in the structure 104. Consequently a structure resource can have a room resource with a trait 404, the room resource is associated with a door, which in turn is associated with a lock controller and resource. The "Locked" trait of the lock can be migrated or up-leveled through subscriptions to the associated door and the associated room. The "Locked" trait of the lock can be queried at the door-level and/or the room-level, in addition to querying the lock resource.

Figure 9:
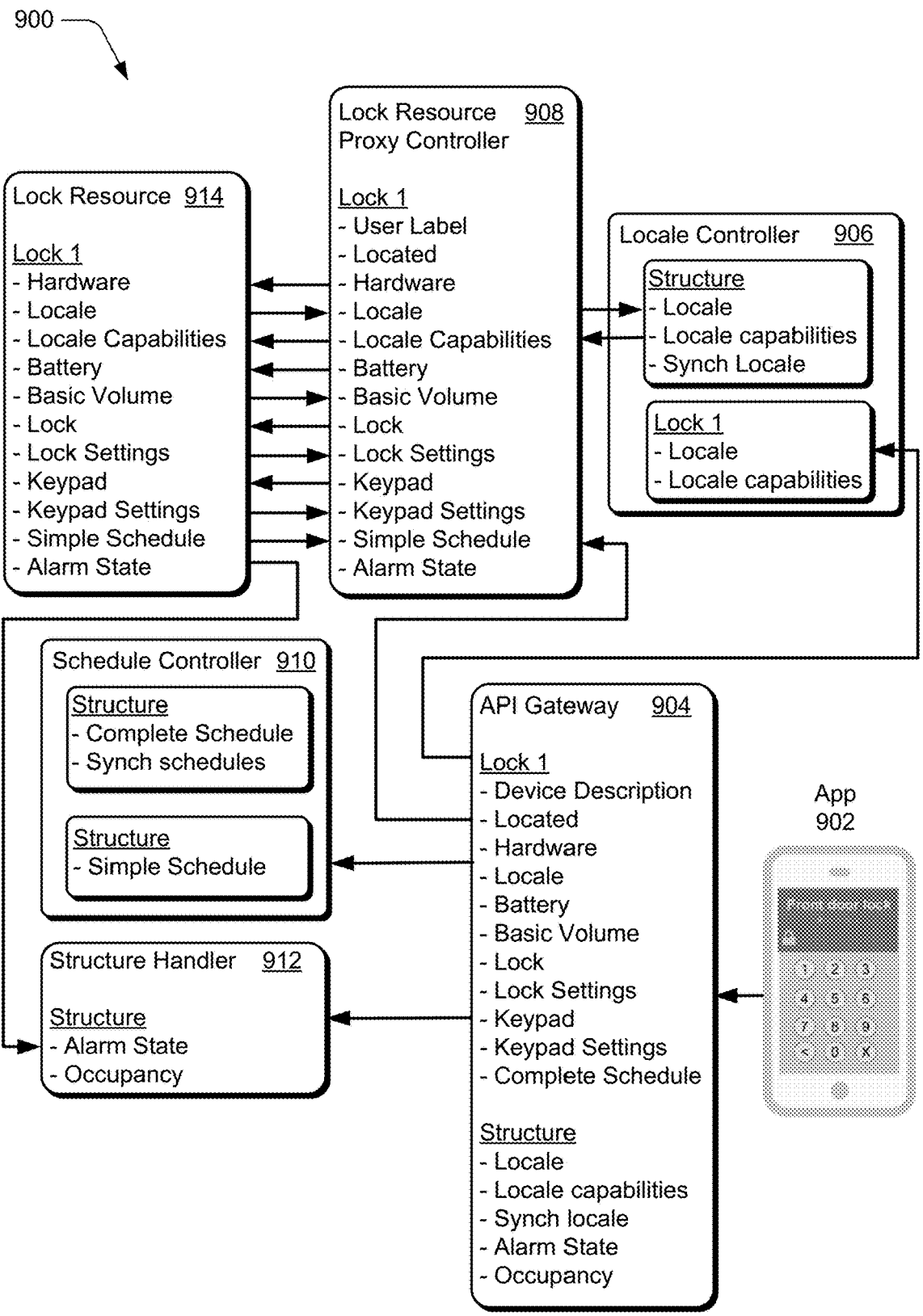
FIG. 9 illustrates an example of an API gateway controller in a distributed computing system in accordance with aspects of the distributed resource model.

FIG. 9 illustrates a further example of the distribution of the traits 404 of the distributed resource model across the distributed computing environment 100. For the sake of clarity in FIG. 9, identifiers of subscriptions are omitted from the figure. Each arrow represents a subscription, the head of the arrow pointing to the publisher in each publish-subscribe relationship. The controllers 602 in the distributed computing environment 100 can be hosted on the cloud service 112, any suitable device such as the mesh network device 102, the border router 106, the hub 120, or any combination thereof.

The app 902 may need to communicate with different hosts to access the various traits of the lock and structure resources. To simplify management of resource connectivity for the app 902, an API gateway 904 is a controller 602 in the cloud service 112 that collects all the traits 404 from the controllers 602 into a single unified view. The API gateway 904 presents the collected traits 404 to clients as a single, consistent view of each resource 406. The app 902 does not need to understand the distributed system servicing each resource 406 or where the traits 404 are hosted in the distributed computing system 100. The app 902 uses the single API Gateway 904 that exposes all the resources 406 that the App 902 is allowed to access. The API gateway 904 may be used by multiple services and/or clients that access the distributed computing system 100 to provide services to the user. The API gateway 904 provides a consistent view of the distributed system for the multiple services and/or clients and can also arbitrate any contention or conflicts between multiple services and/or clients that want to control a given resource.

For example, the API gateway 904 subscribes to the traits 404 from a number of controllers 602, such as a locale controller 906, a lock resource proxy controller 908, a schedule controller 910, and a structure handler controller 912. These controllers 602 also publish and subscribe to various traits 404. For example, the lock resource proxy controller 908 subscribes to the traits of a lock resource 914 and the lock resource 914 subscribes to various traits published by the lock resource proxy controller 908.

Controllers

As illustrated in the examples of FIGS. 6-9, the controllers 602 provide various types of functionality, such as arbitration, complexity management, fan-out of capabilities, coordination, adaptation, and resource proxying. An arbiter controller coordinates disparate inputs to produce a common state, for example deriving home occupancy from a number of inputs from various resources 406 inside and/or outside the structure 104.

The controller 602 can provide higher-level functionality for simple devices, such as providing a complex schedule in the controller 602 for a simple lock resource that includes only a simple schedule or no schedule at all. The controller 602 can fan-out common capabilities across a set of homogenous resources 406, for example controlling a group of lights together.

A coordinator controller 602 provides up-leveled capabilities that are implemented by coordinating across multiple types of devices, such as an HVAC zone controller. An adapter controller 602 bridges devices using other network protocols to the HAN, for example an adapter controller 602 bridges a Universal Plug and Play (UPnP) device to the protocol of the mesh network 200. A resource proxy controller is a proxy for the properties 410 and the commands 412 of a resource 406 with a primary host that is not reliably available due either to device sleepiness or network unreliability.

In aspects, controllers 602 can be used as group controllers for a set of resources. For example, the resources for multiple programmable lights in a room can be grouped together by a controller 602. Each programmable light subscribes to one or more traits in the group lighting controller. When a user changes a setting for a light level in the group lighting controller, that setting is published to the programmable lights, which in turn adjust the light levels to match the published trait.

Controllers 602 can be used as group controllers for location resources. Location groups can be used to define the home topology, including the structure, floors, rooms, and fixtures within the structure 104. Location group resources can include the traits 404 that apply globally to the mesh network devices 102 within the location group. For example, a Structure group includes a number of the traits 404 that apply across a home, such as a Locale that specifies the language to be used on all devices, a Timezone that specifies the time zone to be used by all resources 406, an Occupancy that specifies a home/away status of the home, and so forth.

Some groups are general in nature and can be used for various purposes. In the example of a group of lights, the group resource includes the same light operation traits as the individual lights, which could be controlled at the group level by a client. The associated group controller 602 is responsible for fanning the light operations out to the individual mesh network devices 102. A more complex and heterogeneous group, such as an HVAC zone resource containing thermostats, sensors, shades, and fans, would contain HVAC-related traits. A complex controller would coordinate the various HVAC devices to manage overall climate control in the structure 104.

Users are considered resources 406 for the purpose of managing the properties 410 specific to the user and referencing the user in events 414. For example, a user might have a trait indicating their pincode for access to various devices in the home, and a temporary guest user may include a schedule trait 404 indicating when they are allowed access to the home with a pincode.

In aspects, the controller 602 can be used to orchestrate more expansive functionality by using domain intelligence that takes multiple considerations into account to accomplish an objective, achieve a user intent, or to balance and/or optimize multiple objectives and/or states that may require the arbitration of the control of multiple resources 406 to achieve the desired intent(s) for the multiple objectives. The domain intelligence of an orchestration controller couples logic with the traits 404 to dynamically achieve intents desired by the user more adaptively than schedule-based and/or rule-based controllers.

For example, an orchestration controller is designed to balance user comfort within the structure 104 and minimize energy consumption in the structure 104. The orchestration controller subscribes to a number of traits 404 from other controllers 602 to acquire information used to determine control commands for devices within the structure 104 that achieve the best optimization for a balance of comfort and energy consumption. Other controllers 602 may also subscribe to traits 404 of the orchestration controller.

For example, the information may include weather-related traits from a weather controller, day of the week and time information from schedule and time controllers, temperature and humidity traits from readings made by sensor devices inside and outside the structure 104, an occupancy trait indicating if users are home and user traits from user controllers indicating the presence and preferences of users. The orchestration controller may also incorporate information or events from web services into the orchestration decisions, such as a notification of a demand response event from the electric utility that provides power to the structure 104.

The orchestration controller may determine, based on occupancy traits, schedule traits, and/or historical information, that it is a weekday and that users are not likely to return home until after 5:00 PM. The orchestration controller may decide to lower window shades in the house to reduce heat build-up and monitor temperature traits during the day to determine when to turn on air conditioning to have the home reach a comfortable temperature just as users return home.

However, if the orchestration controller receives a notification of the demand response event from the utility that starts at 3:00 PM, the orchestration controller may, in addition to lowering the window shades, choose to hyper-cool the structure 104 before the demand response event starts. The orchestration controller may incorporate heat-rise traits from a structure controller to determine when to start cooling the structure 104 and how to adjust a set point of the smart thermostat, so that the air conditioning can be turned off by 3:00 PM and that the temperature in the structure 104 will be in a comfortable range when the users arrive home and until the demand response event ends at 7:00 PM.

In another example of an orchestration controller, the state of a user may be used arbitrate between activates of resources in the home, as well as orchestrating optimal conditions for the user. A user controller includes a trait that indicates that the user is a baby, traits that indicate that the baby has been put down for a nap, and traits that indicate that optimal napping conditions are quiet, a darkened room, and fresh air. At the same time as the baby is napping, a cleaning controller determines that a foot traffic trait for the structure, which is derived from a history of occupancy trait information, has exceeded a threshold. Based on exceeding the threshold, the cleaning controller commands a robotic vacuum cleaner begin cleaning.

The baby orchestration controller subscribes to traits of resources that affect the sleep of the baby, such as devices that make noise, an opener for a window in the nursery, and/or sensor resources that monitor sounds outside the structure 104, such as a microphone trait in an outdoor surveillance camera resource. If the sound reported in the microphone trait exceeds a level, or matches a known signature such as the signature of sounds of a garbage truck collecting in the neighborhood, the baby orchestration controller commands the window opener to close the open window. The baby orchestration controller is arbitrating between desirable fresh air and low noise to reach a decision that the action of reducing noise is more important than supplying fresh air at that point in time. The baby orchestration controller may apply further domain logic, such as increasing the level of noise masking from an audio resource in the nursery.

Further, the baby orchestration controller may subscribe to traits of the cleaning controller or publish traits to which the cleaning controller subscribes. To minimize noise during the baby's nap, the baby orchestration controller may publish a quiet-mode trait to which controllers of noise-producing resources, such as the cleaning controller, subscribe. Based on the quiet-mode trait, the cleaning controller delays the vacuum cleaning until the baby is no longer asleep.

Other noise-making resources in the home, such as a television resource, may subscribe to the quiet-mode trait published by the baby orchestration controller. The television resource reduces the volume setting of the television based on the quiet-mode trait. A television controller may also incorporate other traits into the logic to control volume settings. For example, the television controller may use traits of the home graph of the structure 104 to determine the proximity of the television to the nursery. If the television controller determines that its associated television resource is far away from the nursery, the television controller may reduce the volume setting by a smaller amount than if the television resource is determined from the home graph to be in a room next to the nursery.

Trait Migration

As discussed above, the controller 602 can be hosted on the cloud service 112, or on any hub 120 in the structure 104. A controller 602 may be dynamically migrated between hosts in the distributed computing system 100. A controller can be migrated from the cloud service 112 to a hub 120, from the hub 120 to the cloud service 112, between hubs 120, and so forth. For example, a controller 602 hosted on the cloud service 112 can be moved dynamically to the hub 120 in the structure 104, such as moving an HVAC zone controller to a newly installed smart thermostat. The hub can statically host controllers, such as a security hub that is configured with security controllers. Controllers 602 can be dynamically moved to the hub 120. When the hub 120 is put into service, the hub 120 advertises the services that the hub 120 provides. For example, the hub 120 advertises that is capable of hosting controllers 602 for traits 404 of resources 406.

Migrating controllers 602 from the cloud service 112 to the hub 120 does not change the topology of the distributed computing system 100, just where the traits 404 are hosted in the distributed computing system 100. The hubs 120 are monitored for liveness using heartbeat messages between the hubs 120 and the cloud service 112. For example, a topology manager in the cloud service 112 maintains a distributed trait resource topology and manages a fallback of controllers 602 to the cloud service 112, if a hub 120 fails or falls out of communication.

When a device comes online, the device publishes the native device capabilities (i.e. a resource descriptor for the device), the hosting capabilities, and/or the topology requirements of the device. For example, when a security system (such as a security hub 120) comes online, the security system publishes its security capabilities, that it is capable of proxying some number of devices, and that it requires local proxying of all security-based sensor devices. The topology manager then reconfigures the distributed trait resource topology to meet the topology requirements, for example moving security-related sensor (e.g., motion detector, door open sensor, window open sensor, glass breakage sensor, security camera, and so forth) proxying from the cloud to the security hub, and assigning the security system to control security, if there is no other security hub 120 controlling security.

Example methods 1000 and 1100 are described with reference to respective FIGS. 10 and 11 in accordance with one or more aspects of the distributed resource model. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 10:
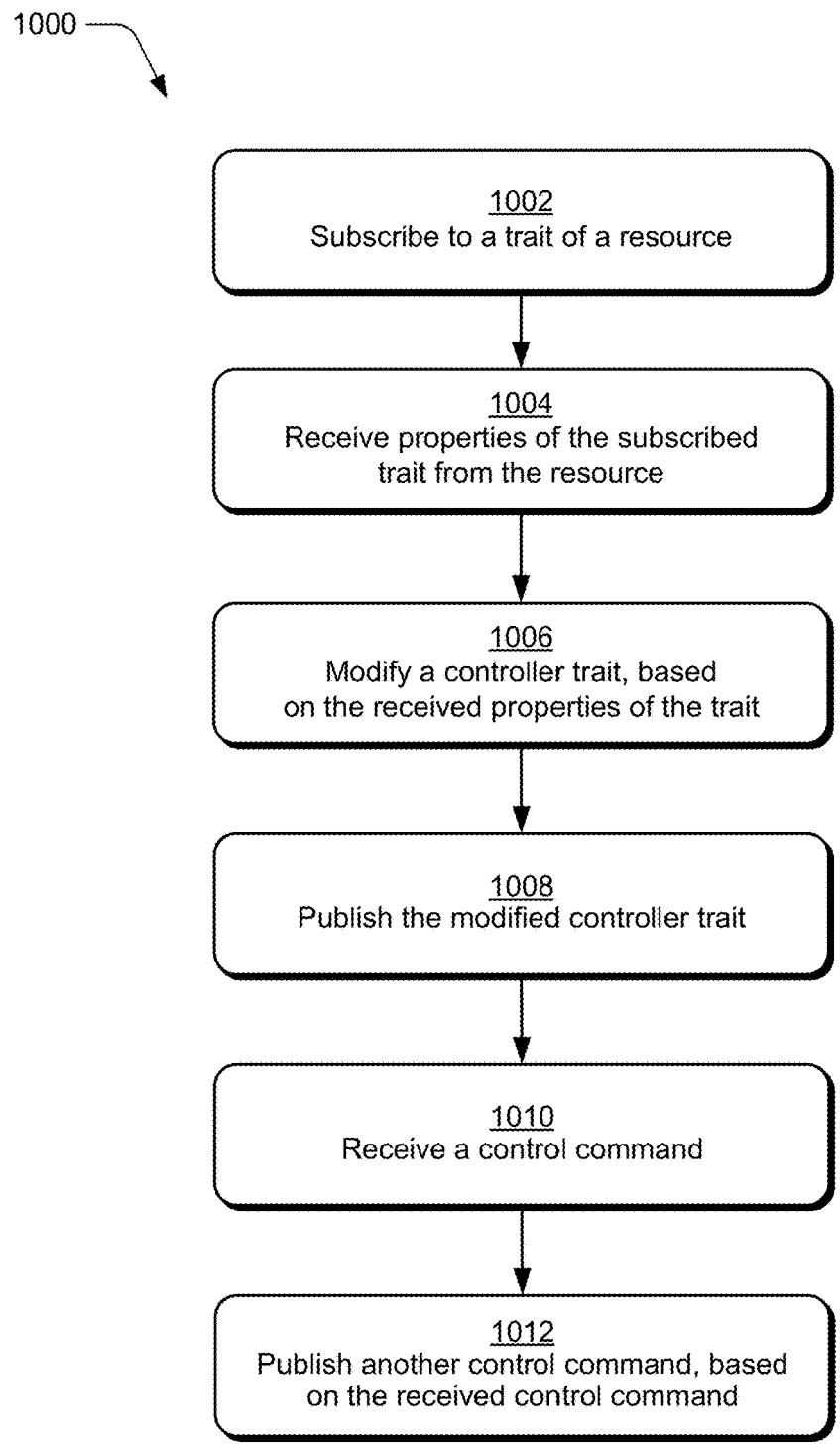
FIG. 10 illustrates an example method of the distributed resource model as generally related to publishing and subscribing to traits in the distributed computing system in accordance with aspects of the techniques described herein.

FIG. 10 illustrates example method(s) 1000 of the distributed resource model as generally related to publishing and subscribing to traits in the distributed computing system 100. The order in which the method blocks are described are not intended to be construed as a limitation, and any number of the described method blocks can be combined in any order to implement a method, or an alternate method.

At block 1002, a controller hosted on a device subscribes to a trait of a resource. For example, a controller 602 at a mesh network device 102 subscribes to a trait 404 of a resource 406.

At block 1004, the controller receives properties of the subscribed trait from the resource. For example, the controller 602 at the mesh network device 102 receives properties 410 of the subscribed trait 404 that is published by the resource 406.

At block 1006, the controller modifies a trait of the controller based on the received properties of the subscribed trait. For example, the controller 602 at the mesh network device 102 modifies a trait 404 of the controller 602 based on the received properties of the trait 404 of the resource 406.

At block 1008, the controller publishes the modified controller trait. For example, the controller 602 at the mesh network device 102 publishes the modified controller trait 404.

At block 1010, in response to publishing the controller trait, the controller receives a control command. For example, the controller 602 receives a control command 412 in response to publishing the modified controller trait 404.

At block 1012, in response to receiving the control command, the controller publishes another control command. For example, the controller 602 processes the received controller command and determines that the received command should cause the controller 602 to publish a control command 412 of a trait 404 to which the resource 406 is subscribed. The controller 602 publishes the control trait which is effective to control a command 412 of the resource 406.

Figure 11:
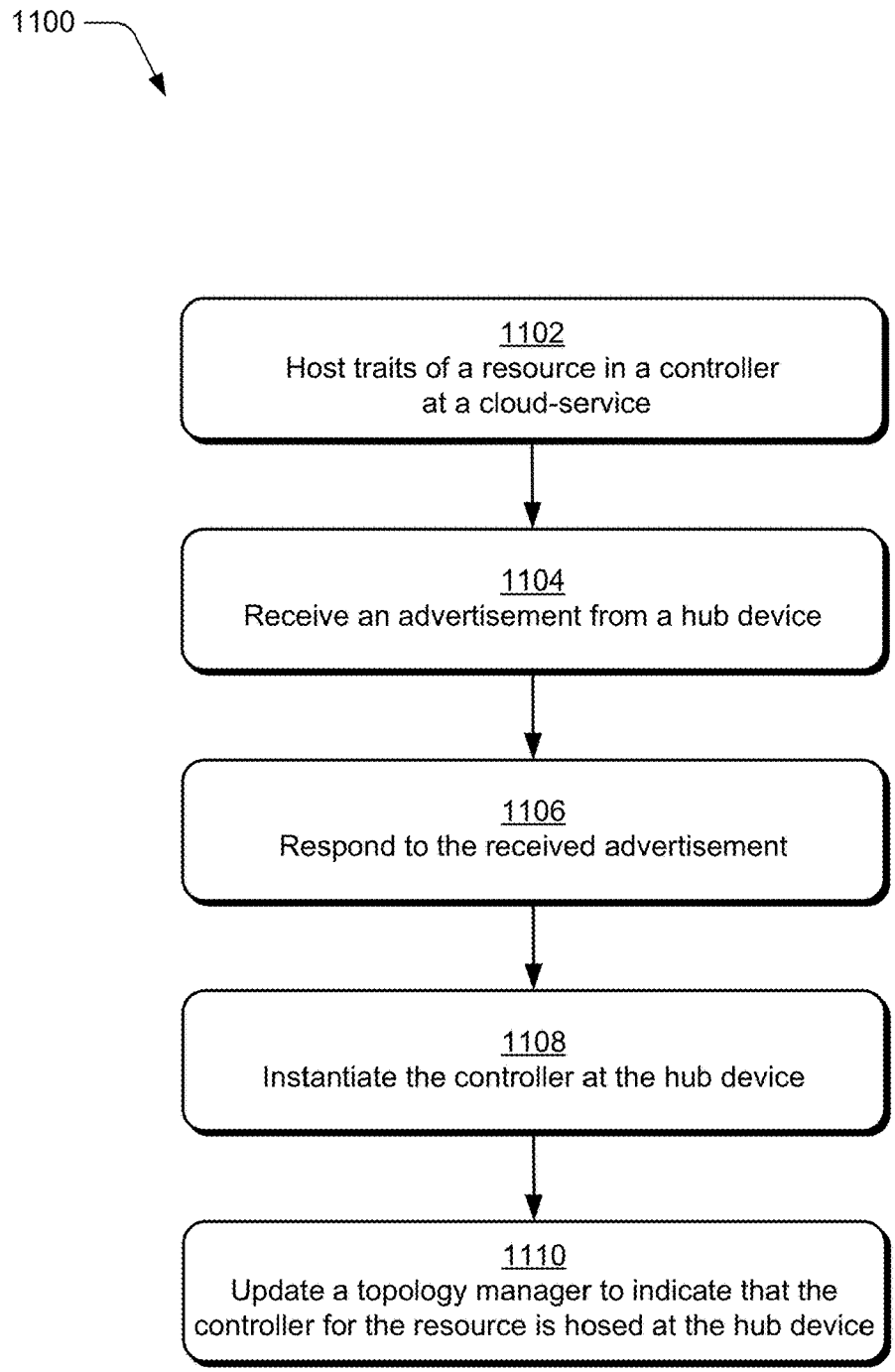
FIG. 11 illustrates another example method of the distributed resource model as generally related to the migration of traits between hosts is the distributed computing system in accordance with aspects of the techniques described herein.

FIG. 11 illustrates example method(s) 1100 of the distributed resource model as generally related to migrating a controller and traits in the distributed computing system 100. The order in which the method blocks are described are not intended to be construed as a limitation, and any number of the described method blocks can be combined in any order to implement a method, or an alternate method.

At block 1102, a resource hosts traits of the resource in a controller at a cloud service. For example, a resource 406 hosts traits 404 of the resource 406 in a controller 602 at the cloud service 112.

At block 1104, the resource receives an advertisement from a hub device indicating that the hub device is capable of hosting a controller for the traits of the resource. For example, the resource 406 receives an advertisement from a hub device 120, in the mesh network 200, indicating that the hub device 120 is capable of hosting the traits 404 of the resource 406.

At block 1106, the resource responds to the advertisement from the hub device requesting that the hub device instantiate a controller for the traits of the resource. For example, the resource 406 responds to the advertisement from the hub device 120, requesting the hub device 120 to instantiate a controller 602 to host the traits 404 of the resource 406.

At block 1108, the hub device instantiates the controller for the traits of the resource. For example, the hub device 120 instantiates the controller 602 to host the traits 404 of the resource 406.

At block 1110, the hub device updates a topology manager in the cloud service to indicate the controller for the resource is hosted at the hub device. For example, the hub device 120 communicates a message to the cloud service 112 that indicates that the hub device 120 is hosting the controller 602 for the traits 404 of the resource 406. The message causes the cloud service 112 to update the topology manager to indicate the hub device 120 is hosting the controller 602 for the traits 404 of the resource 406.

Figure 12:
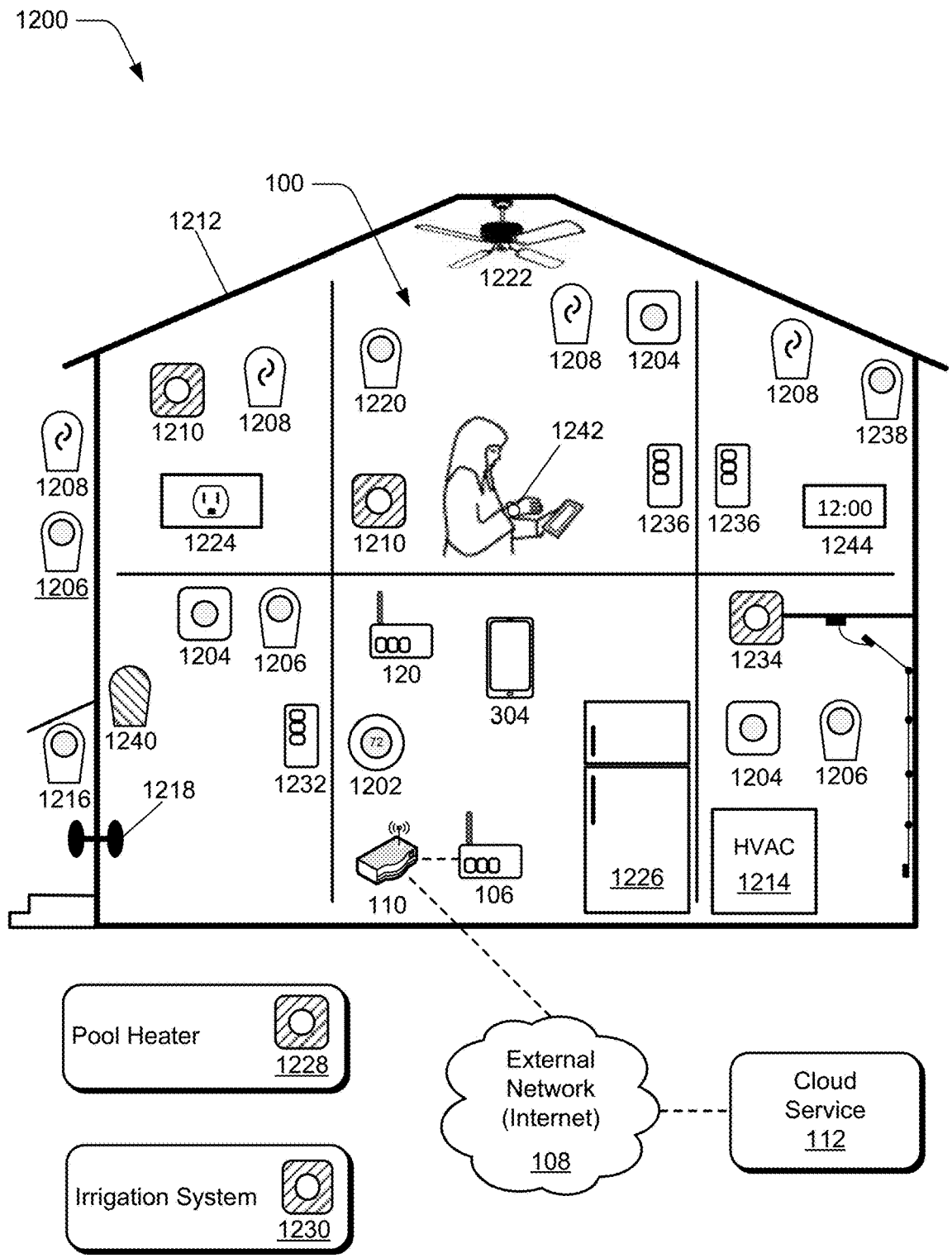
FIG. 12 illustrates an example environment in which a distributed computing system can be implemented in accordance with aspects of the techniques described herein.

FIG. 12 illustrates an example environment 1200 in which the distributed computing system 100 (as described with reference to FIG. 1), and aspects of a distributed resource model can be implemented. Generally, the environment 1200 includes the distributed computing system 100 implemented as part of a smart-home or other type of structure with any number of mesh network devices that are configured for communication in a mesh network. For example, the mesh network devices can include a thermostat 1202, hazard detectors 1204 (e.g., for smoke and/or carbon monoxide), cameras 1206 (e.g., indoor and outdoor), lighting units 1208 (e.g., indoor and outdoor), and any other types of mesh network devices 1210 that are implemented inside and/or outside of a structure 1212 (e.g., in a smart-home environment). In this example, the mesh network devices can also include any of the previously described devices, such as a border router 106, a leader device 306, a commissioning device 304, a hub device 120, as well as any of the devices implemented as a router 202, and/or an end device 206.

In the environment 1200, any number of the mesh network devices can be implemented for wireless interconnection to wirelessly communicate and interact with each other. The mesh network devices are modular, intelligent, multi-sensing, network-connected devices that can integrate seamlessly with each other and/or with a central server or a cloud-computing system to provide any of a variety of useful smart-home objectives and implementations. An example of a mesh network device that can be implemented as any of the devices described herein is shown and described with reference to FIG. 13.

In implementations, the thermostat 1202 may include a Nest® Learning Thermostat that detects ambient climate characteristics (e.g., temperature and/or humidity) and controls a HVAC system 1214 in the smart-home environment. The learning thermostat 1202 and other smart devices "learn" by capturing occupant settings to the devices. For example, the thermostat learns preferred temperature set-points for mornings and evenings, and when the occupants of the structure are asleep or awake, as well as when the occupants are typically away or at home.

A hazard detector 1204 can be implemented to detect the presence of a hazardous substance or a substance indicative of a hazardous substance (e.g., smoke, fire, or carbon monoxide). In examples of wireless interconnection, a hazard detector 804 may detect the presence of smoke, indicating a fire in the structure, in which case the hazard detector that first detects the smoke can broadcast a low-power wake-up signal to all of the connected mesh network devices. The other hazard detectors 1204 can then receive the broadcast wake-up signal and initiate a high-power state for hazard detection and to receive wireless communications of alert messages. Further, the lighting units 1208 can receive the broadcast wake-up signal and activate in the region of the detected hazard to illuminate and identify the problem area. In another example, the lighting units 1208 may activate in one illumination color to indicate a problem area or region in the structure, such as for a detected fire or break-in, and activate in a different illumination color to indicate safe regions and/or escape routes out of the structure.

In various configurations, the mesh network devices 1210 can include an entryway interface device 1216 that functions in coordination with a network-connected door lock system 1218, and that detects and responds to a person's approach to or departure from a location, such as an outer door of the structure 1212. The entryway interface device 1216 can interact with the other mesh network devices based on whether someone has approached or entered the smart-home environment. An entryway interface device 1216 can control doorbell functionality, announce the approach or departure of a person via audio or visual means, and control settings on a security system, such as to activate or deactivate the security system when occupants come and go. The mesh network devices 1210 can also include other sensors and detectors, such as to detect ambient lighting conditions, detect room-occupancy states (e.g., with an occupancy sensor 1220), and control a power and/or dim state of one or more lights. In some instances, the sensors and/or detectors may also control a power state or speed of a fan, such as a ceiling fan 1222. Further, the sensors and/or detectors may detect occupancy in a room or enclosure, and control the supply of power to electrical outlets or devices 1224, such as if a room or the structure is unoccupied.

The mesh network devices 1210 may also include connected appliances and/or controlled systems 1226, such as refrigerators, stoves and ovens, washers, dryers, air conditioners, pool heaters 1228, irrigation systems 1230, security systems 1232, and so forth, as well as other electronic and computing devices, such as televisions, entertainment systems, computers, intercom systems, garage-door openers 1234, ceiling fans 1222, control panels 1236, and the like. When plugged in, an appliance, device, or system can announce itself to the mesh network as described above, and can be automatically integrated with the controls and devices of the mesh network, such as in the smart-home. It should be noted that the mesh network devices 1210 may include devices physically located outside of the structure, but within wireless communication range, such as a device controlling a swimming pool heater 1228 or an irrigation system 1230.

As described above, the mesh network 200 includes a border router 106 that interfaces for communication with an external network 108, outside the mesh network 200. The border router 106 connects to an access point 110, which connects to the external communication network 108, such as the Internet. A cloud service 112, which is connected via the external communication network 108, provides services related to and/or using the devices within the mesh network 200. By way of example, the cloud service 112 can include applications for the commissioning device 304, such as smart phones, tablets, and the like, to devices in the mesh network, processing and presenting data acquired in the mesh network 200 to end users, linking devices in one or more mesh networks 200 to user accounts of the cloud service 112, provisioning and updating devices in the mesh network 200, and so forth. For example, a user can control the thermostat 1202 and other mesh network devices in the smart-home environment using a network-connected computer or portable device, such as a mobile phone or tablet device. Further, the mesh network devices can communicate information to any central server or cloud-computing system via the border router 106 and the access point 110. The data communications can be carried out using any of a variety of custom or standard wireless protocols (e.g., Wi-Fi, ZigBee for low power, 6LoWPAN, Bluetooth Low Energy, etc.) and/or by using any of a variety of custom or standard wired protocols (CAT6 Ethernet, HomePlug, etc.).

Any of the mesh network devices in the mesh network 200 can serve as low-power and communication nodes to create the mesh network 200 in the smart-home environment. Individual low-power nodes of the network can regularly send out messages regarding what they are sensing, and the other low-powered nodes in the environment—in addition to sending out their own messages—can repeat the messages, thereby communicating the messages from node to node (i.e., from device to device) throughout the mesh network. The mesh network devices can be implemented to conserve power, particularly when battery-powered, utilizing low-powered communication protocols to receive the messages, translate the messages to other communication protocols, and send the translated messages to other nodes and/or to a central server or cloud-computing system. For example, an occupancy and/or ambient light sensor can detect an occupant in a room as well as measure the ambient light, and activate the light source when the ambient light sensor 1238 detects that the room is dark and when the occupancy sensor 1220 detects that someone is in the room. Further, the sensor can include a low-power wireless communication chip (e.g., a ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly, using the mesh network, from node to node (i.e., smart device to smart device) within the smart-home environment as well as over the Internet to a central server or cloud-computing system.

In other configurations, various ones of the mesh network devices can function as "tripwires" for a security system in the smart-home environment. For example, in the event a perpetrator circumvents detection by security sensors 1240 located at windows, doors, and other entry points of the structure or environment, an alarm could still be triggered by receiving an occupancy, motion, heat, sound, etc. message from one or more of the low-powered mesh nodes in the mesh network. In other implementations, the mesh network can be used to automatically turn on and off the lighting units 1208 as a person transitions from room to room in the structure. For example, the mesh network devices can detect the person's movement through the structure and communicate corresponding messages via the nodes of the mesh network. Using the messages that indicate which rooms are occupied, other mesh network devices that receive the messages can activate and/or deactivate accordingly. As referred to above, the mesh network can also be utilized to provide exit lighting in the event of an emergency, such as by turning on the appropriate lighting units 1208 that lead to a safe exit. The light units 1208 may also be turned-on to indicate the direction along an exit route that a person should travel to safely exit the structure.

The various mesh network devices may also be implemented to integrate and communicate with wearable computing devices 1242, such as may be used to identify and locate an occupant of the structure, and adjust the temperature, lighting, sound system, and the like accordingly. In other implementations, RFID sensing (e.g., a person having an RFID bracelet, necklace, or key fob), synthetic vision techniques (e.g., video cameras and face recognition processors), audio techniques (e.g., voice, sound pattern, vibration pattern recognition), ultrasound sensing/imaging techniques, and infrared or near-field communication (NFC) techniques (e.g., a person wearing an infrared or NFC-capable smartphone), along with rules-based inference engines or artificial intelligence techniques that draw useful conclusions from the sensed information as to the location of an occupant in the structure or environment.

In other implementations, personal comfort-area networks, personal health-area networks, personal safety-area networks, and/or other such human-facing functionalities of service robots can be enhanced by logical integration with other mesh network devices and sensors in the environment according to rules-based inferencing techniques or artificial intelligence techniques for achieving better performance of these functionalities. In an example relating to a personal health-area, the system can detect whether a household pet is moving toward the current location of an occupant (e.g., using any of the mesh network devices and sensors), along with rules-based inferencing and artificial intelligence techniques. Similarly, a hazard detector service robot can be notified that the temperature and humidity levels are rising in a kitchen, and temporarily raise a hazard detection threshold, such as a smoke detection threshold, under an inference that any small increases in ambient smoke levels will most likely be due to cooking activity and not due to a genuinely hazardous condition. Any service robot that is configured for any type of monitoring, detecting, and/or servicing can be implemented as a mesh node device on the mesh network, conforming to the wireless interconnection protocols for communicating on the mesh network.

The mesh network devices 1210 may also include a smart alarm clock 1244 for each of the individual occupants of the structure in the smart-home environment. For example, an occupant can customize and set an alarm device for a wake time, such as for the next day or week. Artificial intelligence can be used to consider occupant responses to the alarms when they go off and make inferences about preferred sleep patterns over time. An individual occupant can then be tracked in the mesh network based on a unique signature of the person, which is determined based on data obtained from sensors located in the mesh network devices, such as sensors that include ultrasonic sensors, passive IR sensors, and the like. The unique signature of an occupant can be based on a combination of patterns of movement, voice, height, size, etc., as well as using facial recognition techniques.

In an example of wireless interconnection, the wake time for an individual can be associated with the thermostat 1202 to control the HVAC system in an efficient manner so as to pre-heat or cool the structure to desired sleeping and awake temperature settings. The preferred settings can be learned over time, such as by capturing the temperatures set in the thermostat before the person goes to sleep and upon waking up. Collected data may also include biometric indications of a person, such as breathing patterns, heart rate, movement, etc., from which inferences are made based on this data in combination with data that indicates when the person actually wakes up. Other mesh network devices can use the data to provide other smart-home objectives, such as adjusting the thermostat 1202 so as to pre-heat or cool the environment to a desired setting, and turning-on or turning-off the lights 1208.

In implementations, the mesh network devices can also be utilized for sound, vibration, and/or motion sensing such as to detect running water and determine inferences about water usage in a smart-home environment based on algorithms and mapping of the water usage and consumption. This can be used to determine a signature or fingerprint of each water source in the home, and is also referred to as "audio fingerprinting water usage." Similarly, the mesh network devices can be utilized to detect the subtle sound, vibration, and/or motion of unwanted pests, such as mice and other rodents, as well as by termites, cockroaches, and other insects. The system can then notify an occupant of the suspected pests in the environment, such as with warning messages to help facilitate early detection and prevention.

Figure 13:
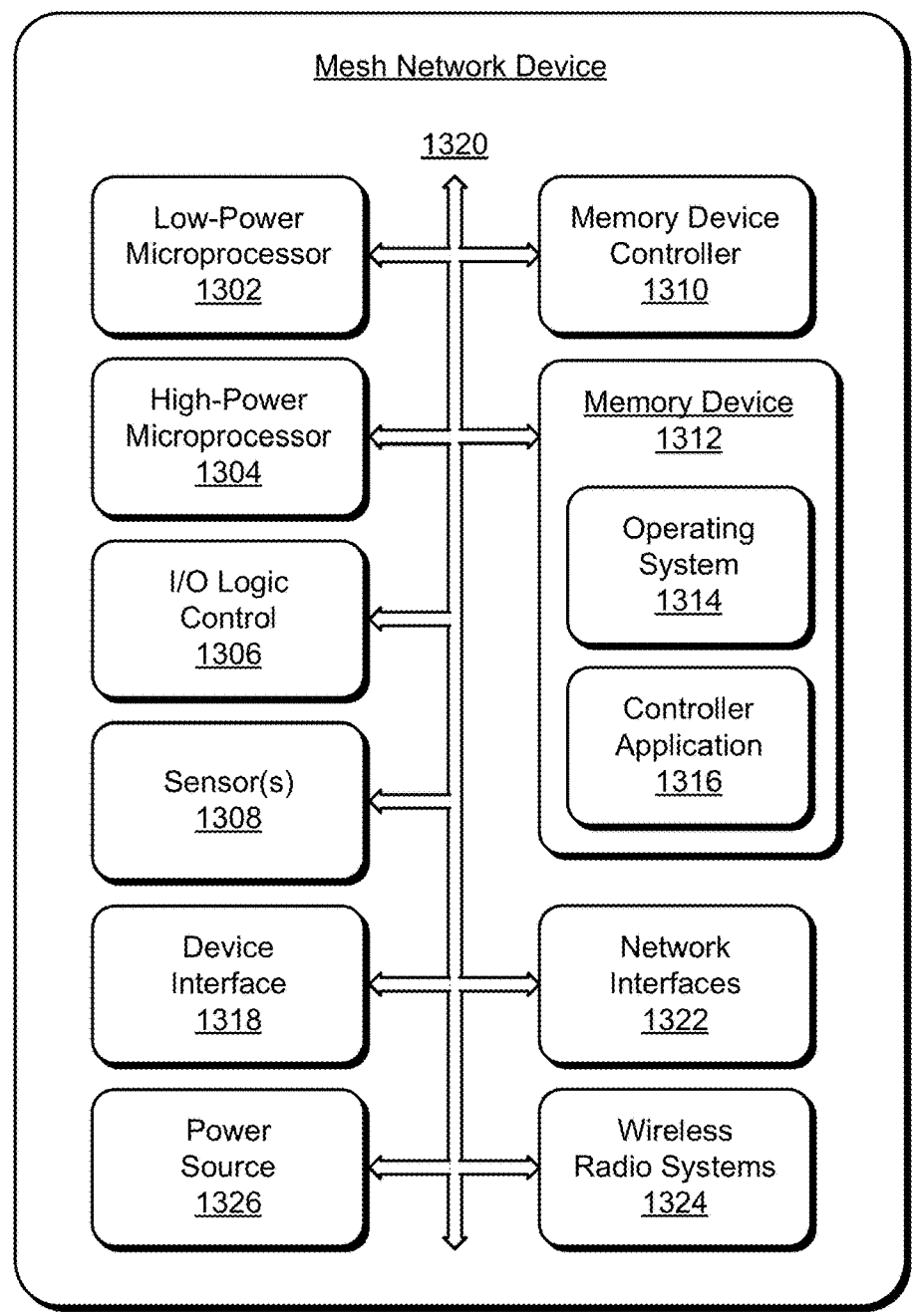
FIG. 13 illustrates an example mesh network device that can be implemented in a distributed computing environment in accordance with one or more aspects of the techniques described herein.

FIG. 13 illustrates an example mesh network device 1300 that can be implemented as any of the mesh network devices in a mesh network in accordance with one or more aspects of the distributed resource model as described herein. The device 1300 can be integrated with electronic circuitry, microprocessors, memory, input output (I/O) logic control, communication interfaces and components, as well as other hardware, firmware, and/or software to implement the device in a mesh network. Further, the mesh network device 1300 can be implemented with various components, such as with any number and combination of different components as further described with reference to the example device shown in FIG. 13.

In this example, the mesh network device 1300 includes a low-power microprocessor 1302 and a high-power microprocessor 1304 (e.g., microcontrollers or digital signal processors) that process executable instructions. The device also includes an input-output (I/O) logic control 1306 (e.g., to include electronic circuitry). The microprocessors can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The low-power microprocessor 1302 and the high-power microprocessor 1304 can also support one or more different device functionalities of the device. For example, the high-power microprocessor 1304 may execute computationally intensive operations, whereas the low-power microprocessor 1302 may manage less complex processes such as detecting a hazard or temperature from one or more sensors 1308. The low-power processor 1302 may also wake or initialize the high-power processor 1304 for computationally intensive processes.

The one or more sensors 1308 can be implemented to detect various properties such as acceleration, temperature, humidity, water, supplied power, proximity, external motion, device motion, sound signals, ultrasound signals, light signals, fire, smoke, carbon monoxide, global-positioning-satellite (GPS) signals, radio-frequency (RF), other electromagnetic signals or fields, or the like. As such, the sensors 1308 may include any one or a combination of temperature sensors, humidity sensors, hazard-related sensors, security sensors, other environmental sensors, accelerometers, microphones, optical sensors up to and including cameras (e.g., charged coupled-device or video cameras, active or passive radiation sensors, GPS receivers, and radio frequency identification detectors. In implementations, the mesh network device 1300 may include one or more primary sensors, as well as one or more secondary sensors, such as primary sensors that sense data central to the core operation of the device (e.g., sensing a temperature in a thermostat or sensing smoke in a smoke detector), while the secondary sensors may sense other types of data (e.g., motion, light or sound), which can be used for energy-efficiency objectives or smart-operation objectives.

The mesh network device 1300 includes a memory device controller 1310 and a memory device 1312, such as any type of a nonvolatile memory and/or other suitable electronic data storage device. The mesh network device 1300 can also include various firmware and/or software, such as an operating system 1314 that is maintained as computer executable instructions by the memory and executed by a microprocessor. The device software may also include a controller application 1316 that implements aspects of the distributed resource model. The mesh network device 1300 also includes a device interface 1318 to interface with another device or peripheral component, and includes an integrated data bus 1320 that couples the various components of the mesh network device for data communication between the components. The data bus in the mesh network device may also be implemented as any one or a combination of different bus structures and/or bus architectures.

The device interface 1318 may receive input from a user and/or provide information to the user (e.g., as a user interface), and a received input can be used to determine a setting. The device interface 1318 may also include mechanical or virtual components that respond to a user input. For example, the user can mechanically move a sliding or rotatable component, or the motion along a touchpad may be detected, and such motions may correspond to a setting adjustment of the device. Physical and virtual movable user-interface components can allow the user to set a setting along a portion of an apparent continuum. The device interface 1318 may also receive inputs from any number of peripherals, such as buttons, a keypad, a switch, a microphone, and an imager (e.g., a camera device).

The mesh network device 1300 can include network interfaces 1322, such as a mesh network interface for communication with other mesh network devices in a mesh network, and an external network interface for network communication, such as via the Internet. The mesh network device 1300 also includes wireless radio systems 1324 for wireless communication with other mesh network devices via the mesh network interface and for multiple, different wireless communications systems. The wireless radio systems 1324 may include Wi-Fi, Bluetooth™, Mobile Broadband, Bluetooth Low Energy (BLE), and/or point-to-point IEEE 802.15.4. Each of the different radio systems can include a radio device, antenna, and chipset that is implemented for a particular wireless communications technology. The mesh network device 1300 also includes a power source 1326, such as a battery and/or to connect the device to line voltage. An AC power source may also be used to charge the battery of the device.

Figure 14:
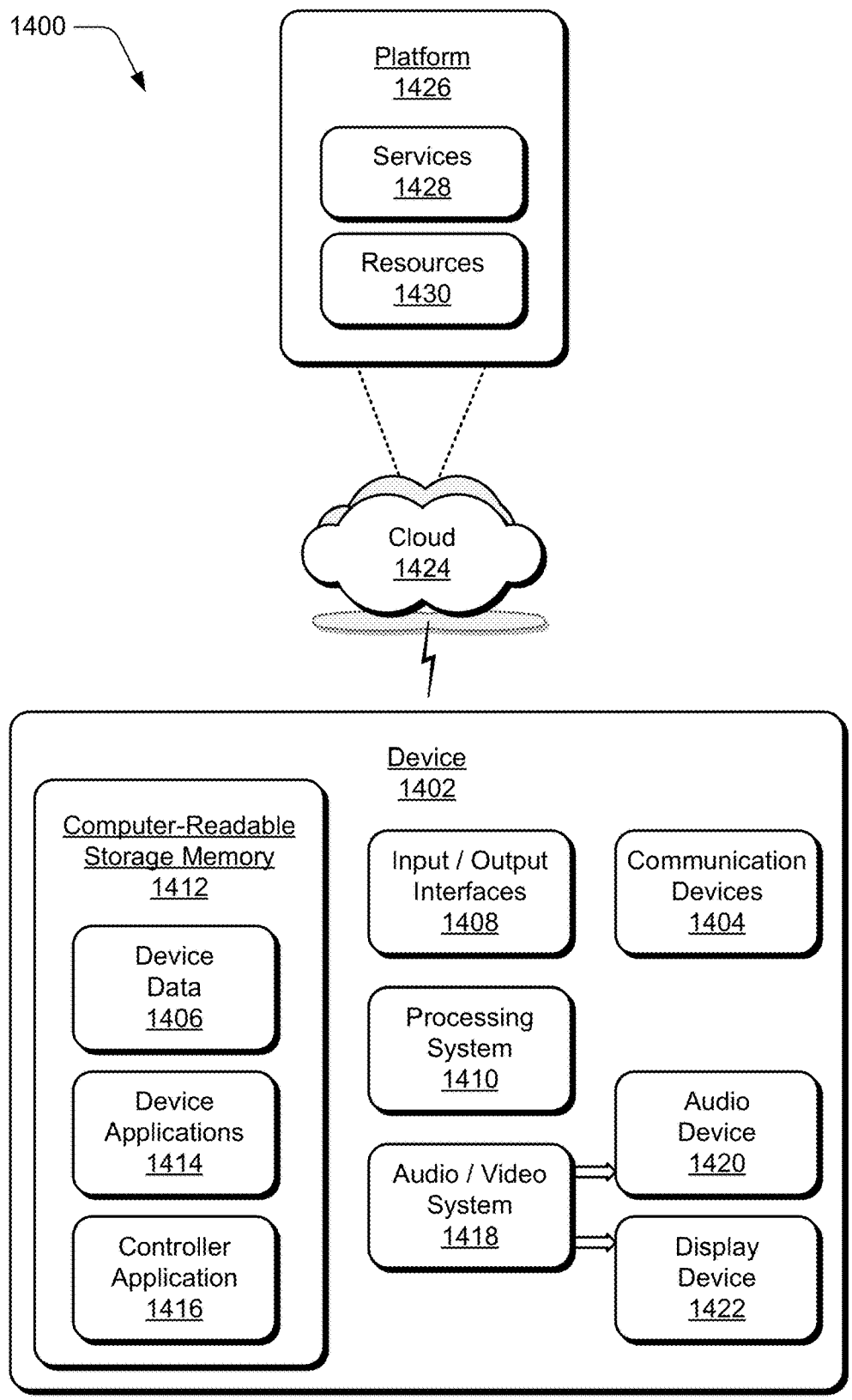
FIG. 14 illustrates an example system with an example device that can implement aspects of the distributed resource model.

FIG. 14 illustrates an example system 1400 that includes an example device 1402, which can be implemented as any of the mesh network devices that implement aspects of the distributed resource model as described with reference to the previous FIGS. 1-13. The example device 1402 may be any type of computing device, client device, mobile phone, tablet, communication, entertainment, gaming, media playback, and/or other type of device. Further, the example device 1402 may be implemented as any other type of mesh network device that is configured for communication on a mesh network, such as a thermostat, hazard detector, camera, light unit, commissioning device, router, border router, joiner router, joining device, end device, leader, access point, a hub, and/or other mesh network devices.

The device 1402 includes communication devices 1404 that enable wired and/or wireless communication of device data 1406, such as data that is communicated between the devices in a mesh network, data that is being received, data scheduled for broadcast, data packets of the data, data that is synched between the devices, etc. The device data can include any type of communication data, as well as audio, video, and/or image data that is generated by applications executing on the device. The communication devices 1404 can also include transceivers for cellular phone communication and/or for network data communication.

The device 1402 also includes input/output (I/O) interfaces 1408, such as data network interfaces that provide connection and/or communication links between the device, data networks (e.g., a mesh network, external network, etc.), and other devices. The I/O interfaces can be used to couple the device to any type of components, peripherals, and/or accessory devices. The I/O interfaces also include data input ports via which any type of data, media content, and/or inputs can be received, such as user inputs to the device, as well as any type of communication data, as well as audio, video, and/or image data received from any content and/or data source.

The device 1402 includes a processing system 1410 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 1402 may further include any type of a system bus or other data and command transfer system that couples the various components within the device. A system bus can include any one or combination of different bus structures and architectures, as well as control and data lines.

The device 1402 also includes computer-readable storage memory 1412, such as data storage devices that can be accessed by a computing device, and that provide persistent storage of data and executable instructions (e.g., software applications, modules, programs, functions, and the like). The computer-readable storage memory described herein excludes propagating signals. Examples of computer-readable storage memory include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage memory in various memory device configurations.

The computer-readable storage memory 1412 provides storage of the device data 1406 and various device applications 1414, such as an operating system that is maintained as a software application with the computer-readable storage memory and executed by the processing system 1410. The device applications may also include a device manager, such as any form of a control application, software application, signal processing and control module, code that is native to a particular device, a hardware abstraction layer for a particular device, and so on. In this example, the device applications also include a controller application 1416 that implements aspects of the distributed resource model, such as when the example device 1402 is implemented as any of the mesh network devices described herein.

The device 1402 also includes an audio and/or video system 1418 that generates audio data for an audio device 1420 and/or generates display data for a display device 1422. The audio device and/or the display device include any devices that process, display, and/or otherwise render audio, video, display, and/or image data, such as the image content of a digital photo. In implementations, the audio device and/or the display device are integrated components of the example device 1402. Alternatively, the audio device and/or the display device are external, peripheral components to the example device. In aspects, at least part of the techniques described for the distributed resource model may be implemented in a distributed system, such as over a "cloud" 1424 in a platform 1426. The cloud 1424 includes and/or is representative of the platform 1426 for services 1428 and/or resources 1430.

The platform 1426 abstracts underlying functionality of hardware, such as server devices (e.g., included in the services 1428) and/or software resources (e.g., included as the resources 1430), and connects the example device 1402 with other devices, servers, etc. The resources 1430 may also include applications and/or data that can be utilized while computer processing is executed on servers that are remote from the example device 1402. Additionally, the services 1428 and/or the resources 1430 may facilitate subscriber network services, such as over the Internet, a cellular network, or Wi-Fi network. The platform 1426 may also serve to abstract and scale resources to service a demand for the resources 1430 that are implemented via the platform, such as in an interconnected device embodiment with functionality distributed throughout the system 1400. For example, the functionality may be implemented in part at the example device 1402 as well as via the platform 1426 that abstracts the functionality of the cloud 1424.

Although aspects of the distributed resource model have been described in language specific to features and/or methods, the subject of the appended claims is not necessarily limited to the specific features or methods described. Rather, the specific features and methods are disclosed as example implementations of the distributed resource model, and other equivalent features and methods are intended to be within the scope of the appended claims. Further, various different aspects are described and it is to be appreciated that each described aspect can be implemented independently or in connection with one or more other described aspects.

The invention claimed is:

1. A method to distribute traits of a resource by a controller at a host device resource in a home area network, the method comprising:
   subscribing to a trait of the resource included in the home area network, by the controller at the host device resource;
   receiving, from the resource, properties of the subscribed trait;
   based on the receiving the properties of the trait, modifying a controller trait; and
   publishing the controller trait.

2. The method of claim 1, further comprising:
   in response to the publishing the controller trait, receiving, by the controller, a command for the controller; and
   publishing an other command based on the received command for the controller, the other command being a command of the resource.

3. The method of claim 2, wherein the resource subscribes to the other command of the controller, and wherein the subscription to the other command enables the resource to receive the other command from the controller.

4. The method of claim 1, wherein the controller trait includes the trait of the resource and an additional trait of the resource.

5. The method of claim 1, wherein the controller trait includes the properties of the subscribed trait and a property of the controller.

6. The method of claim 1, wherein the resource is a device that sleeps periodically, wherein the device does not communicate in the home area network during the sleep periods, and wherein the controller responds on behalf of the resource during the sleep periods.

7. The method of claim 1, wherein the host device resource is a mesh network device, a hub device, or a border router.

8. An electronic device implemented as a hub device, the electronic device comprising:
   a mesh network interface for communication in a home area network; and
   a memory and processing system to implement an application for a controller that is configured to:
      subscribe to a trait of a resource included in the home area network;
      receive, from the resource, properties of the subscribed trait;
      based on the received properties of the trait, modify a controller trait; and
      publish the controller trait.

9. The electronic device of claim 8, wherein the controller application is configured to:
   in response to the publication of the controller trait, receive a command for the controller; and
   publish an other control command based on the received command for the controller, the other control command being a command of the resource.

10. The electronic device of claim 9, wherein the resource subscribes to the other command of the controller, and wherein the subscription to the other command enables the resource to receive the other command from the controller.

11. The electronic device of claim 8, wherein the controller trait includes the trait of the resource and properties of the controller.

12. The electronic device of claim 8, wherein the hub device is a mesh network router, a border router, a smart thermostat, or a security hub.

13. The electronic device of claim 8, wherein the controller application is configured to:
   advertise that the hub device is capable of hosting the controller for the trait of a resource; and
   instantiate the controller for the trait of the resource.

14. The electronic device of claim 8, wherein the controller trait includes the properties of the subscribed trait and a property of the controller.

15. The electronic device of claim 8, wherein the resource is a device that sleeps periodically, wherein the device does not communicate in the home area network during the sleep periods, and wherein the controller responds on behalf of the resource during the sleep periods.

16. A non-transitory computer-readable storage medium comprising instructions for a controller at a hub, the instructions executable by one or more processors, to configure the hub to:
   subscribe to a trait of a resource included in a home area network;
   receive, from the resource, properties of the subscribed trait;
   based on the received properties of the trait, modify a controller trait; and
   publish the controller trait.

17. The non-transitory computer-readable storage medium of claim 16, the instructions further executable to configure the hub to:
   advertise that the hub is capable of hosting the controller for the trait of a resource; and
   instantiate the controller for the trait of the resource.

18. The non-transitory computer-readable storage medium of claim 16, the instructions further executable to configure the hub to:
   in response to the publication of the controller trait, receive a command for the controller; and publish an other control command based on the received command for the controller, the other control command being a command of the resource.

19. The non-transitory computer-readable storage medium of claim 18, wherein the resource subscribes to the other command of the controller, and wherein the subscription to the other command enables the resource to receive the other command from the controller.

20. The non-transitory computer-readable storage medium of claim 16, wherein the controller trait includes the properties of the subscribed trait and a property of the controller.

\* \* \* \* \*